United States Patent
Chen et al.

(10) Patent No.: US 10,766,023 B2
(45) Date of Patent: Sep. 8, 2020

(54) ZEOLITE SYNTHESIS WITH ALKALINE EARTH METAL

(71) Applicant: Johnson Matthey Public Limited Company, London (GB)

(72) Inventors: Hai-Ying Chen, Wayne, PA (US); Joseph Fedeyko, Wayne, PA (US); Raul Lobo, Newark, DE (US); Nicholas McNamara, Wayne, PA (US); Trong Pham, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/706,983

(22) Filed: Dec. 9, 2019

(65) Prior Publication Data

US 2020/0114342 A1 Apr. 16, 2020

Related U.S. Application Data

(63) Continuation of application No. 15/718,624, filed on Sep. 28, 2017, now Pat. No. 10,500,573.

(Continued)

(51) Int. Cl.
*C01B 39/48* (2006.01)
*B01J 29/70* (2006.01)
(Continued)

(52) U.S. Cl.
CPC .............. *B01J 29/78* (2013.01); *B01D 53/94* (2013.01); *B01D 53/944* (2013.01); *B01D 53/9413* (2013.01); *B01D 53/9418* (2013.01); *B01D 53/9422* (2013.01); *B01J 20/18* (2013.01); *B01J 29/70* (2013.01); *B01J 29/72* (2013.01); *B01J 29/74* (2013.01); *B01J 29/76* (2013.01); *B01J 35/002* (2013.01); *B01J 35/0006* (2013.01); *B01J 35/04* (2013.01); *B01J 37/0018* (2013.01); *B01J 37/04* (2013.01); *B01J 37/10* (2013.01); *B01J 37/30* (2013.01); *C01B 39/026* (2013.01); *C01B 39/04* (2013.01); *C01B 39/08* (2013.01); *C01B 39/48* (2013.01);

(Continued)

(58) Field of Classification Search
CPC ... C01B 39/026; C01B 39/48; C01P 2004/40; B01J 20/18; B01J 29/70; B01J 29/72; B01J 29/74; B01J 29/76; B01J 29/78; B01J 2229/186; B01D 53/9418; B01D 2255/91

See application file for complete search history.

(56) References Cited

U.S. PATENT DOCUMENTS 4,508,837 A * 4/1985 Zones ............... B01J 29/04
423/326
9,868,643 B2 * 1/2018 Elomari ............ C07D 207/06
(Continued)

OTHER PUBLICATIONS

Fickel et al, "Copper Coordination in Cu—SSZ-13 and Cu—SSZ-16 Investigated by Variable Temperature XRD", J. Phys. Chem. C (2010), 1145, 1633-1640 (Year: 2010).*

(Continued)

*Primary Examiner* — David M Brunsman

(57) ABSTRACT

Provided are a novel form of AFX zeolite, a novel synthesis technique for producing pure phase small pore zeolites, a novel synthesis method for producing a zeolite with an increased Al pair content, a catalyst comprising the AFX zeolite in combination with a metal, and methods of using the same.

8 Claims, 12 Drawing Sheets

Related U.S. Application Data

(60) Provisional application No. 62/402,708, filed on Sep. 30, 2016.

(51) Int. Cl.

| | | |
|---|---|---|
| *B01J 29/76* | (2006.01) | |
| *B01D 53/94* | (2006.01) | |
| *B01J 29/78* | (2006.01) | |
| *C01B 39/04* | (2006.01) | |
| *C01B 39/02* | (2006.01) | |
| *B01J 35/00* | (2006.01) | |
| *B01J 29/72* | (2006.01) | |
| *B01J 20/18* | (2006.01) | |
| *B01J 29/74* | (2006.01) | |
| *B01J 35/04* | (2006.01) | |
| *B01J 37/00* | (2006.01) | |
| *B01J 37/04* | (2006.01) | |
| *B01J 37/10* | (2006.01) | |
| *B01J 37/30* | (2006.01) | |
| *C01B 39/08* | (2006.01) | |
| *F01N 3/022* | (2006.01) | |
| *F01N 3/035* | (2006.01) | |
| *F01N 3/08* | (2006.01) | |
| *F01N 3/10* | (2006.01) | |
| *F01N 3/20* | (2006.01) | |

(52) U.S. Cl.
CPC ............ *B01D 2255/1023* (2013.01); *B01D 2255/2042* (2013.01); *B01D 2255/2045* (2013.01); *B01D 2255/2047* (2013.01); *B01D 2255/2092* (2013.01); *B01D 2255/30* (2013.01); *B01D 2255/50* (2013.01); *B01D 2255/91* (2013.01); *B01D 2255/915* (2013.01); *B01D 2255/9155* (2013.01); *B01D 2258/012* (2013.01); *B01J 2229/183* (2013.01); *B01J 2229/186* (2013.01); *C01P 2002/72* (2013.01); *C01P 2004/03* (2013.01); *F01N 3/0222* (2013.01); *F01N 3/035* (2013.01); *F01N 3/0814* (2013.01); *F01N 3/0842* (2013.01); *F01N 3/103* (2013.01); *F01N 3/2066* (2013.01); *F01N 2330/02* (2013.01); *F01N 2370/04* (2013.01)

(56) References Cited

U.S. PATENT DOCUMENTS 9,908,108 B2 *   3/2018  Davis ................. B01D 53/8628
10,500,573 B2 *  12/2019  Chen ....................... B01J 29/70

OTHER PUBLICATIONS

Hrabanek et al, "Static in-situ hydrothermal synthesis of small pore zeolite SSZ-16 . . . " Microporous and Mesoporous Materials 228 (2016) [[ 107-115 (Year: 2016).*

* cited by examiner

ZEOLITE SYNTHESIS WITH ALKALINE EARTH METAL

CROSS REFERENCE TO RELATED APPLICATIONS

This application claims priority to U.S. Provisional Application No. 62/402,708, filed Sep. 30, 2016.

FIELD OF INVENTION

The present invention relates to a new form of AFX having crystals with a short hexagonal prism morphology, a new form of AFX having an increased concentration of Al pairs, novel methods for synthesizing small pore zeolites using an alkaline earth metal, and to the use of such zeolites as catalysts for treating combustion exhaust gas.

DESCRIPTION OF RELATED ART

Zeolites are molecular sieves having unique lattice frameworks constructed of alumina and silica cages. The Internal Zeolite Association (IZA) assigns each unique framework type a three-letter code, such as MOR, CHA, or BEA.

Synthesis of zeolite crystals typically involves reacting alumina and silica in the presence of an organic template (also referred to as a structure directing agent or SDA; similarly, SDA cations can be referred to as SDA$^+$) at elevated temperatures for several days. During crystallization, the alumina and silica co-join to form a crystalline structure around the SDA. The reactants, reaction conditions, and the species of SDA all impact which type or types of framework that are synthesized. When sufficient crystallization has occurred, the crystals are removed from the mother liquor and dried. After the crystals are separated from the mother liquor, the organic SDA is thermally degraded and removed from the crystalline structure, thus leaving a porous molecular sieve.

Zeolites are useful as catalyst for various industrial processes, such as selectively reducing $NO_x$ in combustion exhaust gases. Several zeolites, such as zeolite Beta and ZSM-5, have been identified as being particularly useful for these types of applications. Zeolite catalysts have also been identified as being useful for hydrocarbon cracking and reforming. Typical small pore zeolites are synthesized in the presence of alkaline metal (e.g., Na and K). However, the presence of the alkaline metal (e.g., Na) can lead to various impurities in final products. For example, when AFX zeolite is synthesized in the presence of Na$^+$, mordenite zeolite can be an impurity in the final product. In addition, these impurities can at times affect the crystalline forms and/or may contain rod-like crystals. Thus, there is still a need for a novel and improved synthesis to produce phase pure small pore zeolites.

SUMMARY OF THE INVENTION

An aluminosilicate zeolite can comprise at least about 90% phase pure AFX framework, wherein the aluminosilicate zeolite has a short hexagonal prism morphology. The aluminosilicate zeolite can have a mean crystal size of about 0.5 µm to about 7 µm. The aluminosilicate zeolite can have a $D_{90}$ crystal size of about 0.5 µm to about 7 µm, about 0.5 µm to about 5 µm or about 1 µm to about 3 µm. The aluminosilicate zeolite can comprise at least about 95% or at least about 97% phase pure AFX framework. The aluminosilicate zeolite can be free or substantially free of medium and large pore frameworks. The aluminosilicate zeolite can be free or substantially free of zeolite Y framework. The aluminosilicate zeolite can have a silica-to-alumina ratio of about 12 to about 50, about 20 to about 40, about 20 to about 25, or about 25 to about 35. The aluminosilicate zeolite can further comprise an alkaline earth metal. The alkaline earth metal can be selected from the group consisting of Sr, Ba, and a combination there of. The molar ratio of alkaline earth metal to alumina can be less than about 0.1. The aluminosilicate zeolite can be free or substantially free of alkaline metal.

A method for making an aluminosilicate zeolite having a small pore framework can comprise reacting a synthesis gel comprising at least one zeolite, a structure directing agent, an alkaline earth metal source, and an optional silica source at a temperature of at least about 100° C. until crystals of the small pore zeolite form. The crystals of the small pore zeolite crystals can be at least about 90% phase pure. The crystals of the small pore zeolite crystals can have an SAR of about 12 to about 50. The crystals of the small pore zeolite crystals can have a mean crystal size of about 0.5 to about 7 µm. The small pore zeolite be selected from the group consisting of AFX, AEI, and CHA. The alkaline earth metal can be selected from the group consisting of Sr, Ba, and a combination thereof. The at least one zeolite can be the only silica and aluminum source. The zeolite can be zeolite Y. Zeolite Y can have a silica-to-alumina ratio of about 12 to about 60. The at least one zeolite can comprise two or more zeolites. The at least one zeolite can comprise two or more zeolite Y. The synthesis gel can be free or substantially free of alkaline metal. The alkaline metal can be Na. The synthesis gel can have a ratio of $SDA_2O/SiO_2$ of less than about 1.5. The synthesis gel can have one or more, two or more, three or more, four or more, five or more, or all six of the following compositional molar ratios:

$SiO_2/Al_2O_3$ of about 10 to about 80;
$Na_2O/Al_2O_3$ of about 0 to about 2;
$M_{AE}O/Al_2O_3$ of about 0.3 to about 1.5 ($M_{AE}$ can be Ca, Sr, or Ba);
$SDA_2O/Al_2O_3$ of about 0.7 to about 20;
$H_2O/Al_2O_3$ of about 300 to about 3000; and
$OH^-/SiO_2$ of about 0.25 to about 0.5.

The SDA cation can be 1,3-bis(1-adamantyl)imidazolium, N,N-diethyl-cis 2,6-dimethylpiperidinium, N,N-dimethyl-3,5-dimethylpiperidinium, N,N,N-1-trimethyladamantylammonium, or N,N,N-dimethylethylcyclohexylammonium. The reacting step can be performed at a temperature of about 120-180° C. for about 3 to about 15 days.

A catalyst for treating an exhaust gas comprising a pure phase AFX zeolite that comprises an extra-framework metal selected from V, Cr, Mn, Fe, Co, Ni, Cu, Zn, Mo, Ru, Rh, Pd, Ag, W, Re, Os, Ir, Pt, and Au, wherein the zeolite has a short hexagonal prism morphology. The metal can be Fe or Cu. The metal can be selected from Pt, Ru, and Pd.

A method for storing $NO_x$ can comprise contacting an exhaust gas stream containing $NO_x$ with a catalyst described herein.

A method for selectively reducing $NO_x$ can comprise contacting an exhaust gas stream containing $NO_x$ with a catalyst described herein.

A method for oxidizing a component of an exhaust gas can comprise contacting an exhaust gas stream containing the component with a catalyst described herein, wherein the component is selected from CO, hydrocarbon, and $NH_3$.

A catalyst article can comprise a catalyst described herein supported on or incorporated into a substrate selected from a wall-flow honeycomb filter and a flow-through honeycomb substrate.

A catalyst for hydrocarbon cracking can comprise a pure phase AFX zeolite, wherein the AFX zeolite has a short hexagonal prism morphology.

A catalyst for methanol to olefin (MTO) conversion can comprise a pure phase AFX zeolite, wherein the AFX zeolite has a short hexagonal prism morphology.

A catalyst for methane to methanol conversion can comprise a pure phase AFX zeolite, wherein the AFX zeolite has a short hexagonal prism morphology.

A catalyst for water treatment and/or purification can comprise a pure phase AFX zeolite, wherein the AFX zeolite has a short hexagonal prism morphology.

An aluminosilicate zeolite comprising a framework comprising a number of Al pairs that is at least twice the number of aluminum pairs in a reference aluminosilicate zeolite comprising the same framework, where the reference aluminosilicate was synthesized using a reaction media comprising an alkali metal. The number of Al pairs can be determined by $Co^{2+}$ exchange. The aluminosilicate zeolite can comprise a metal having a 2+ charge, preferably Ba, Ca, Mg, Sr, or a combination thereof. The aluminosilicate zeolite can be free or substantially free of alkaline metal. The alkali metal can be sodium. The aluminosilicate zeolite can have a number of Al pairs that is at least three, four, five six or seven times the number of aluminum pairs in a reference aluminosilicate zeolite comprising the same framework. The aluminosilicate zeolite can have a framework that is a small pore framework. The framework can be AEI, AFX or CHA. The aluminosilicate zeolite can comprise at least about 90%, 95% or 97% phase pure AEI, AFX or CHA framework. The aluminosilicate zeolite can have a silica-to-alumina ratio of about 10 to about 50, about 10 to about 30, or about 15 to about 25. The aluminosilicate zeolite can comprise a first cage and a second cage and the structure directing agent (SDA) can comprise a first SDA primarily contained in the first cage and a second SDA primarily contained in the second cage in the zeolite prior to removal of the SDAs. The removal of the SDAs can be performed by calcination or extraction of the aluminosilicate zeolite or degradation of the SDA.

A catalytic article can comprise a substrate and an aluminosilicate zeolite comprising a framework comprising a number of Al pairs that is at least twice the number of aluminum pairs in a reference aluminosilicate zeolite comprising the same framework, where the reference aluminosilicate was synthesized using a reaction media comprising an alkali metal.

A system can comprise a catalytic article comprising a substrate and an aluminosilicate zeolite comprising a framework comprising a number of Al pairs that is at least twice the number of aluminum pairs in a reference aluminosilicate zeolite comprising the same framework, where the reference aluminosilicate was synthesized using a reaction media comprising an alkali metal.

A method of making the aluminosilicate zeolite comprising a substrate and an aluminosilicate zeolite comprising a framework comprising a number of Al pairs that is at least twice the number of aluminum pairs in a reference aluminosilicate zeolite comprising the same framework, where the reference aluminosilicate was synthesized using a reaction media comprising an alkali metal, can comprise reacting a synthesis gel comprising at least one zeolite or an alkali free alumina source, a structure directing agent, an alkaline earth metal source, and an optional silica source at a temperature of at least about 100° C. until crystals of the small pore zeolite form. The number of Al pairs can be determined by $Co^{2+}$ exchange. The method can further comprise removing the alkaline earth metal to form an ammonium or hydrogen form. The method can further comprise introducing a promoter metal into the zeolite as an extra-framework metal. The small pore zeolite crystals can be at least about 90%, 95% or 97% phase pure. The small pore zeolite crystals can have an SAR of about 12 to about 50. The small pore zeolite crystals can have a mean crystal size of about 0.5 to about 7 μm. The small pore zeolite can be AFX, AEI, CHA, or a combination thereof. The alkaline earth metal can be Ba, Ca, Sr, or a combination thereof. The at least one zeolite can be the only silica and aluminum source. The zeolite can be zeolite Y. Zeolite Y can have a silica-to-alumina ratio of about 12 to about 60. The at least one zeolite can comprise two or more zeolites. The at least one zeolite can comprise two or more zeolite Y. The synthesis gel can be free or substantially free of alkaline metal, preferably the alkaline metal is Na. The synthesis gel can have a ratio of $SDA_2O/SiO_2$ of less than about 1.5. The synthesis gel can have one or more, two or more, three or more, four or more, five or more, or all six of the following compositional molar ratios:

$SiO_2/Al_2O_3$ of about 10 to about 80;
$Na_2O/Al_2O_3$ of about 0 to about 2;
$M_{AE}O/Al_2O_3$ of about 0.3 to about 1.5 ($M_{AE}$ can be Ca, Sr, or Ba);
$SDA_2O/Al_2O_3$ of about 0.7 to about 20;
$H_2O/Al_2O_3$ of about 300 to about 3000; and
$OH^-/SiO_2$ of about 0.25 to about 0.5.

The SDA can comprise a cation selected from the group consisting of 1,3-bis(1-adamantyl)imidazolium, N,N-diethyl-cis 2,6-dimethylpiperidinium, N,N-dimethyl-3,5-dimethylpiperidinium, N,N,N-1-trimethyladamantylammonium, and N,N,N-dimethylethylcyclohexylammonium. The reacting step can be performed at a temperature of about 120-180° C. for about 1 to about 21 days. The method can produce an aluminosilicate zeolite comprising a first cage and a second cage where the structure directing agent (SDA) comprises a first SDA and a second SDA, where the first SDA is primarily contained in the first cage and a second SDA primarily contained in the second cage in the zeolite prior to removal of the SDAs.

A method for increasing the number of Al pairs in an aluminosilicate zeolite comprising a framework comprising a number of Al pairs that is at least twice the number of aluminum pairs in a reference aluminosilicate zeolite comprising the same framework, where the reference aluminosilicate was synthesized using a reaction media comprising an alkali metal, where the method can comprise increasing the ratio of alkaline earth metal source to the alkali. The step of increasing the ratio of alkaline earth metal source to the alkali can comprise reacting a synthesis gel comprising at least one zeolite or an alkali free alumina source, a structure directing agent, an alkaline earth metal source, and an optional silica source at a temperature of at least about 100° C. until crystals of the small pore zeolite form.

A method of increasing the catalytic activity of a small pore zeolite comprises forming a small pore zeolite comprising a framework having an increased number of Al pairs compared to a comparable zeolite produced using an alkali metal. The method can further comprise introducing a promoter metal into the zeolite as an extra-framework metal.

DETAILED DESCRIPTION OF THE INVENTION

Figure 1:
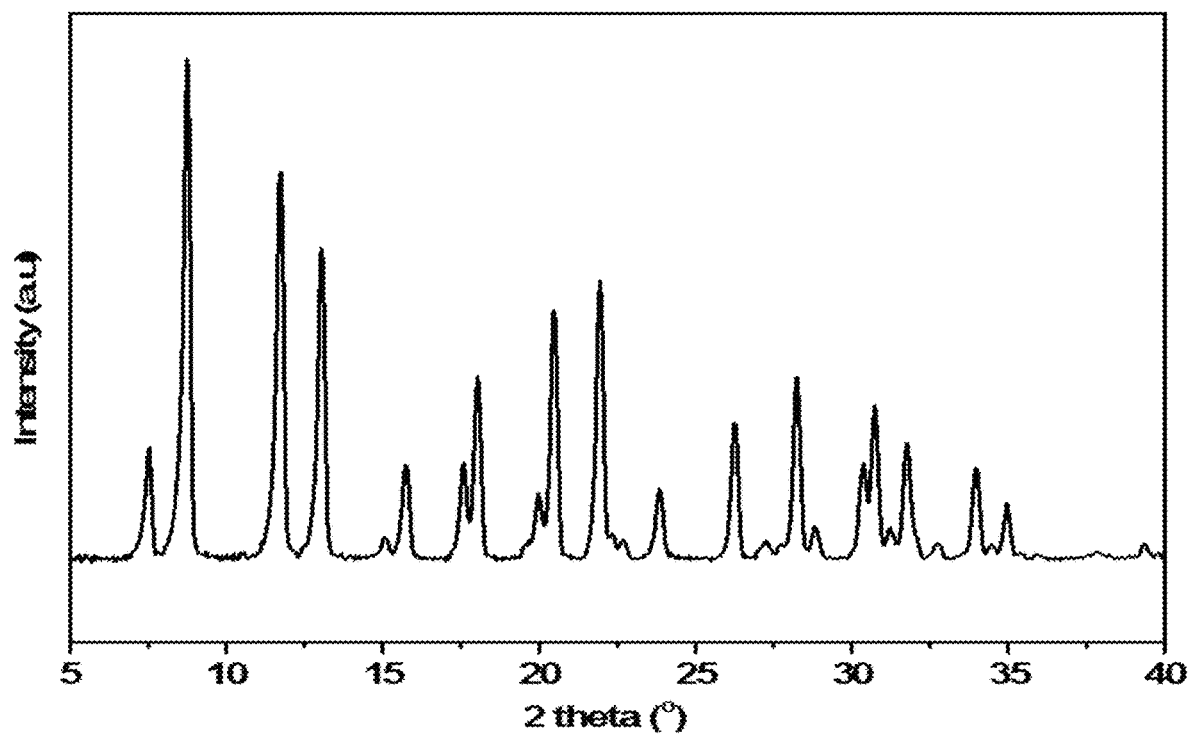
FIG. 1 is an XRD pattern of a pure phase AFX zeolite (JMZ-7) according to Example 1.

One aspect of the present invention is directed to an aluminosilicate zeolite comprising at least about 90% phase pure AFX framework wherein the aluminosilicate zeolite has a short hexagonal prism morphology.

As used herein, the terms "AEI", "AFX" and "CHA" refer to an AEI, AFX and CHA framework type, respectively, as recognized by the International Zeolite Association (IZA) Structure Commission. The term "zeolite" refers to an aluminosilicate molecular sieve having a framework composed primarily of alumina and silica moieties, and thus does not include other isotypes such as SAPOs, AlPOs, and the like. As used herein, the term "pure phase" means that at least about 90 percent of the zeolite framework is type AFX. As used herein, the term "percent" in connection with the zeolite framework means:

percent crystallinity=$I_{crystalline}/(I_{crystalline}+I_{amorphous})$
($I$=intensity), where the intensities are determined from XRD.

The impurities can be amorphous, different crystalline phases, or different framework types (e.g., undissolved FAU, MOR, and/or ITE).

The AFX zeolite can contain at least about 95 percent, or even at least about 97 percent of the AFX framework. The AFX zeolite can be substantially free of other crystalline phases and typically is not an intergrowth of two or more framework types.

The AFX zeolite can be substantially free of large pore frameworks. The AFX zeolite can also be substantially free of medium pore frameworks. The AFX zeolite can be substantially free of zeolite Y, which has an FAU framework which is a large pore framework. As used herein, the term "substantially free" means that the zeolite contains less than about 10, 8, 6, 4, 2, or 1 percent of the named framework or non-framework impurity.

As used herein, the term "free of" a material means that that material is not added to the process to make the aluminosilicate zeolite or that the material is not present at a level that is detrimental to the desired use of the aluminosilicate zeolite.

As used herein, the term "large pore" means a framework having a maximum ring size of at least 12 tetrahedral atoms, "medium pore" means a framework having a maximum ring size of at least 10 tetrahedral atoms, and the term "small pore" means a framework having a maximum ring size of at least 8 tetrahedral atoms.

The term "short" in connection with the hexagonal prism means that height of the hexagonal prism (H) is no more than base length of the hexagonal prism (B) (i.e., H/B≤1/1).

Alternatively, the aluminosilicate zeolite can comprise at least about 90% phase pure AFX framework wherein the aluminosilicate zeolite has a hexagonal prism morphology with a ratio of height of the hexagonal prism (H)/base length of the hexagonal prism (B) no more than about 1/1.

AFX zeolites of the present invention can have a silica-to-alumina molar ratio (SAR) of about 12 to about 50, such as about 15 to about 20, about 20 to about 25, about 25 to about 30, about 30 to about 50. The SAR is based on the synthesized zeolite crystal and not the starting synthesis gel. The silica-to-alumina ratio of zeolites can be determined by conventional analysis. This ratio is meant to represent, as closely as possible, the ratio in the rigid atomic framework of the zeolite crystal and to exclude silicon or aluminum in the binder or in cationic or other form within the channels. Since it can be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

The AFX zeolite crystals of the present invention preferably can have a mean crystal size and/or a $D_{90}$ crystal size of about 0.5 μm to about 7 μm, such as about 0.5 μm to about 2.5 μm, about 2.5 μm to about 7 μm or about 2.5 μm to about 5 μm. The crystal size is based on individual crystals (including twinned crystals) but does not include agglomerations of crystals. Crystal size is the length of longest diagonal of the three dimensional crystal. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest diagonal of the individual crystals are measured and recorded. (Particles that are clearly large polycrystalline aggregates should not be included the measurements.) Based on these measurements, the arithmetic mean of the sample crystal sizes is calculated.

The AFX crystals can be milled to adjust the composition's particle size. Alternatively, the AFX crystals can be unmilled.

The aluminosilicate zeolite can further comprise an alkaline earth metal. Examples of suitable alkaline earth metals include, but are not limited to, Mg, Sr, Ba, Ca, and a combination thereof. Preferably the alkaline earth metal is selected from the group consisting of Sr, Ba, and a combination thereof.

The molar ratio of alkaline earth metal to alumina in the aluminosilicate zeolite can be less than about 0.1.

The aluminosilicate zeolite can further comprise an alkaline metal. Examples of suitable alkaline metals include, but are not limited to, Na, K, and a combination thereof. Preferably the alkaline metal is selected from the group consisting of Na, K, and a combination thereof.

The aluminosilicate zeolite can further comprise an alkaline earth metal and an alkaline metal.

The aluminosilicate zeolite can also be substantially free of alkaline metal.

The aluminosilicate zeolite can also be free of alkaline metal.

The aluminosilicate zeolite can also be substantially free of an alkaline earth metal.

The aluminosilicate zeolite can also be substantially free of an alkaline earth metal other than Ba or Sr.

The aluminosilicate zeolite can also be free of an alkaline earth metal.

The aluminosilicate zeolite can also be free of an alkaline earth metal other than Ba or Sr.

Figure 5:
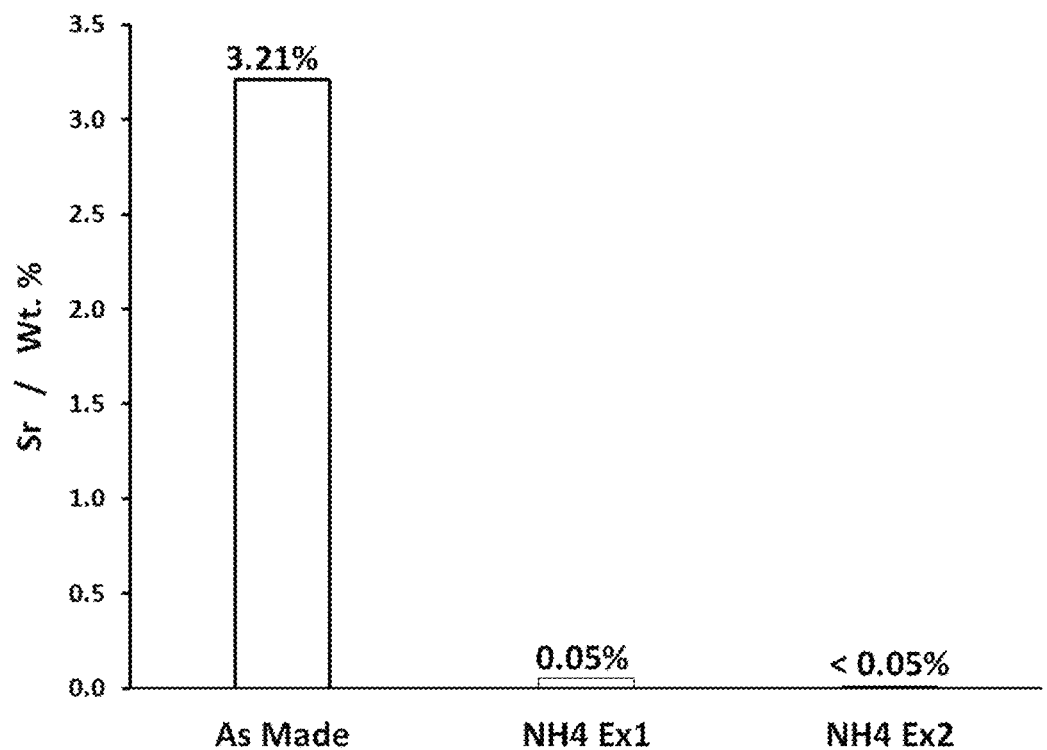
FIG. 5 is a graph showing the strontium content in AFX synthesized in $Sr^{2+}$ after initial synthesis followed by one and two successive $NH_4$ exchanges as determined by ICP

It has been discovered that when AFX is synthesized using $Sr^{2+}$ or $Ba^{2+}$ in an alkali free reaction mixture and the $Sr^{2+}$ or $Ba^{2+}$ is later removed, the number of Al pairs in the zeolite is greater than the number of Al pairs an AFX zeolite made using sodium (Na). The term "Al pairs" is defined as two Al sites that are close enough in proximity within the crystalline zeolite framework such that both negative framework charges induced by Al substitution can be balanced by the same $Co^{2+}$ ion. $Sr^{2+}$ or $Ba^{2+}$ are preferably used in the reaction mixture as $Sr(OH)_2$ or $Ba(OH)_2$ so that these hydroxide ions can provide the desired pH for the reaction to form the zeolite. Other salts of Sr or Br, such as chloride or nitrate, can be used. When a salt other than hydroxide is used, it may be necessary to provide a source of hydroxide to the reaction mixture to achieve the pH necessary for the aluminosilicate zeolite to form. Strontium or barium can be removed from the zeolite by various methods known in the art, such as one or more successive ammonium exchanges, ion-exchange or the conversion of the zeolite to a H-form. While the addition of an acid may be used in replacing the Sr or Ba, it is important to prevent excessive dealumination of the zeolite. FIG. 5 shows that a sample of pure phase AFX synthesized using $Sr(OH)_2$ (AFX.Sr) that was then calcined contained 3.21% Sr and that one ammonium ($NH_4$) exchange removed 98% of the Sr from AFX.Sr.

Figure 6:
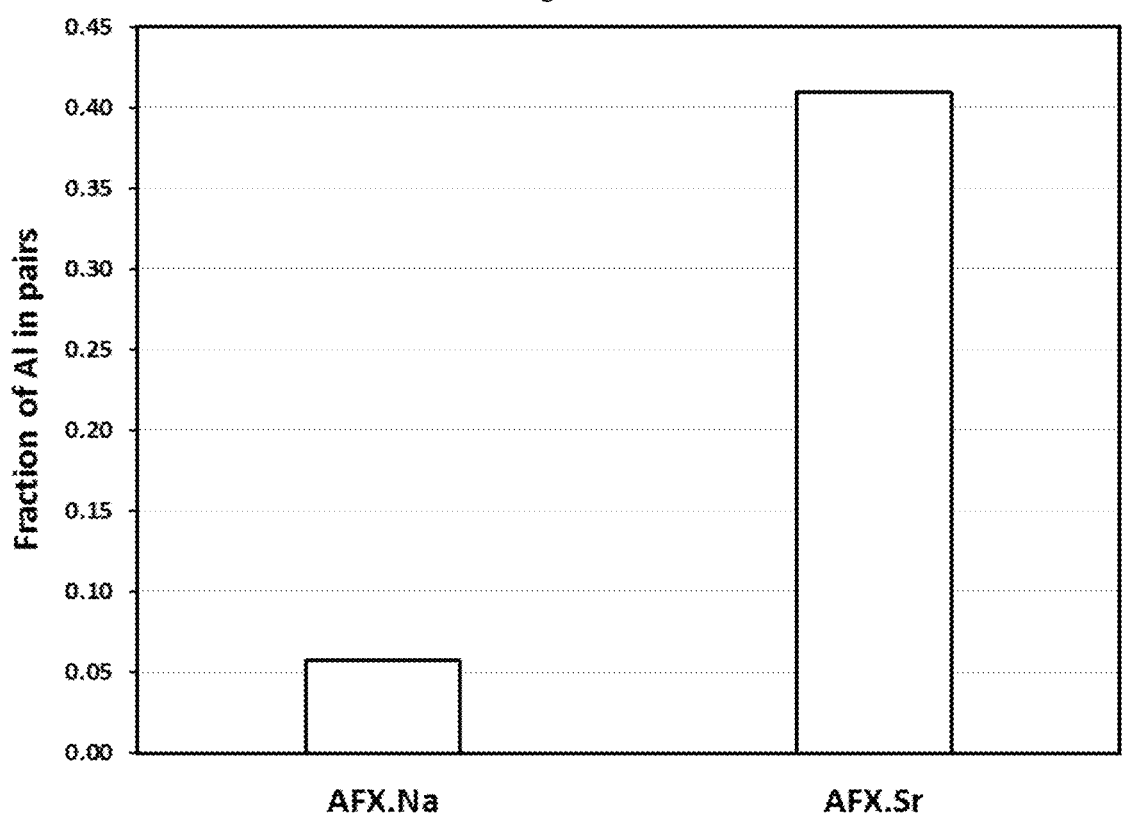
FIG. 6 is a graph showing the fraction of Al in pairs for AFX synthesized in $Na^+$ and AFX synthesized in $Sr^{2+}$ as determined by the $Co^{2+}$ titration method.

The number of Al pairs can be determined by $Co^{2+}$ titration. (Wichterlova et al, Phys. Chem. Chem. Phys., 2002, 4, 5406-5413)(Grounder et al, Chem. Mater. 2016. 28, 2236-2247)(Grounder et al, ACS Catal. 2017, 7, 6663-6674). The number of Al pairs in a zeolite can be calculated by two methods to determine either the absolute number of Al pairs or the normalized number of Al pairs. The absolute number of Al pairs in the zeolite can be determined by first saturating all Al pair sites with $Co^{2+}$ as described in Experimental Details. The $Co^{2+}$ content in moles of $Co^{2+}$ per gram of zeolite can then be determined by elemental analysis such as ICP. Each $Co^{2+}$ can be assumed to balance two negative charges induced by two Al sites in a pair, thus by multiplying $Co^{2+}$ content by a factor of two yields the number of Al sites in pairs (preferably in mmoles per gram of zeolite). This method provides a useful metric if the goal of the material design is to maximize the number of Al in pair sites in the zeolite. The normalized number of Al pairs in the zeolite can be determined by first measuring the total Al content by elemental analysis such as XRF. The Al content in pair sites can then be directly divided by the total Al content to calculate the fraction of Al in pair sites. This method provides a useful metric if the goal of the material design is to maximize the number of Al in pair sites while minimizing the number of Al in isolated sites in the zeolite. This method also provides a useful way to directly compare two materials with different total Al content (i.e. different SARs). FIG. 6A shows that an AFX zeolite made using $Sr^{2+}$ had approximately 0.563 mmols of the Al as Al pairs per gram of zeolite, while an AFX zeolite made using $Na^+$ had only approximately 0.136 mmols of the Al as Al pairs per gram of zeolite. FIG. 6B shows that an AFX zeolite made using $Sr^{2+}$ had approximately 40% of the Al as Al pairs, while an AFX zeolite made using $Na^+$ had only approximately 6% of the Al as Al pairs.

Another aspect of the present invention is directed to a method for making an aluminosilicate zeolite having a small pore framework comprising reacting a synthesis gel comprising at least one zeolite, a structure directing agent (SDA), an alkaline earth metal source, and an optional silica source at a temperature of at least about 100° C. until crystals of the small pore zeolite form.

Examples of suitable small pore zeolites include, but are not limited to, AEI, CHA, AFX, EAB, KFI, LEV, LTA, RTH, SFW, and IHW. The small pore zeolite can be selected from the group consisting of AEI, CHA, AFX, EAB, KFI, and LEV. Preferably the small pore zeolite is selected from the group consisting of AFX, AEI, and CHA. More preferably the small pore zeolite is AFX or AEI. The small pore zeolite can be CHA. The small pore zeolite can be AEI. The small pore zeolite can be AFX.

The small pore zeolite crystals can be at least about 90, 95, or 97% phase pure.

The small pore zeolite crystals can have an SAR of about 12 to about 50, about 15 to about 20, about 20 to about 25, about 25 to about 30, or about 30 to about 50.

The small pore zeolites of the present invention can be preferably prepared with an organic SDA. Examples of suitable organic SDA cations include, but are not limited to, 1,3-bis(1-adamantyl)imidazolium, N,N-diethyl-cis 2,6-dimethylpiperidinium, N,N,N-1-trimethyladamantammonium, N,N,N-dimethylethylcyclohexylammonium, and a combination thereof. Preferably the SDA cation is selected from the group consisting of 1,3-bis(1-adamantyl)imidazolium, N,N-diethyl-cis 2,6-dimethylpiperidinium, N,N-dimethyl-3,5-dimethylpiperidinium, N,N,N-1-trimethyladamantylammonium, and N,N,N-dimethylethylcyclohexylammonium. More preferably. the SDA cation can be 1,3-bis(1-adamantyl)imidazolium. Alternatively, or in addition, the SDA cation can be N,N-diethyl-cis 2,6-dimethylpiperidinium or N,N-dimethyl-3,5-dimethylpiperidinium. The SDA cation can be N,N,N-1-trimethyladamantylammonium. The SDA cation can be N,N,N-dimethylethylcyclohexylammonium.

The SDA cation of the present invention is typically associated with anions which can be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like.

The zeolite synthesis can be in the presence of halogens, such as fluorine.

The zeolite synthesis can be preferably free of halogens, such as fluorine.

The alkaline earth metal source can be in salt forms. The alkaline earth metal source can also be in alkaline earth metal exchanged zeolite forms. Examples of suitable alkaline earth metal sources include, but are not limited to, $Sr(OH)_2$, $Ba(OH)_2$, $Ca(OH)_2$, Sr exchanged zeolite (e.g., Sr-zeolite Y), and Ba exchanged zeolite (e.g., Ba-zeolite Y). Preferably the alkaline earth metal cation is selected from the group consisting of Sr, Ba, and a combination thereof.

The SDA, the at least one zeolite, the alkaline earth metal source, and an optional silica source can be mixed as prepared as a synthesis gel. The at least one zeolite can be ammonium-form zeolites, hydrogen-form zeolites, or alkaline earth metal exchanged zeolites (e.g., $NH_4$-form zeolite Y, H-form zeolite Y, alkaline earth metal exchanged zeolite Y). The at least one zeolite can be zeolite Y. Examples of the at least one zeolite include, but are not limited to, zeolite Y (e.g., CBV 500, CBV712, CBV720, CBV760, and CBV780). Zeolite Y can have a silica-to-alumina ratio of about 5 to about 80, about 10 to about 40, or about 15 to about 30.

The at least one zeolite can have a lower framework density than the aluminosilicate zeolite.

The aluminosilicate zeolite of the methods of synthesis as described above can be CHA, wherein the SAR of the aluminosilicate zeolite can be about 13 to about 80, about 13 to about 40, or about 30 to about 70.

The aluminosilicate zeolite of the methods of synthesis as described above can be AEI, wherein the SAR of the aluminosilicate zeolite can be about 20 to about 60, about 20 to about 30, or about 30 to about 60.

The aluminosilicate zeolite of the methods of synthesis as described above can be AFX, the SAR of the aluminosilicate zeolite can be about 20 to about 60, about 20 to about 30, or about 30 to about 60.

Examples of suitable silica sources include, but are not limited to, silica powders such as Cabosil M5 or colloid silica (Ludox), tetraalkyl silicates such as tetraethyl orthosilicate (TEOS).

The least one of the zeolites can be an alkaline earth metal exchanged zeolite (e.g., Ba-Zeolite Y, Sr-Zeolite Y), wherein the zeolite can also be an alkaline earth metal source of the synthesis gel.

The alkaline earth metal cation of the present invention is typically associated with anions which can be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like.

The synthesis gel of the methods of synthesis as described above can further comprise an alkaline metal source. Examples of suitable alkaline metal sources include, but are not limited to, NaOH, KOH. Preferably the alkaline metal is selected from the group consisting of Na, K, and a combination thereof. More preferably the alkaline metal is Na.

The synthesis gel of the methods of synthesis as described above can further comprise an alkaline earth metal source and an alkaline metal source.

The synthesis gel can also be substantially free of alkaline metal. Typically, the synthesis gel comprises less than about 4, 3, 2, or 1% of the alkaline metal. The alkaline metal can be Na. Unless otherwise specified, all compositional percentages used herein are based on weight.

The synthesis gel can be free of alkaline metal.

The at least one zeolite can be the only silica and aluminum source to form the small pore zeolite.

The at least one zeolite in the synthesis gel can comprise two or more zeolites. Preferably the two or more zeolites are zeolites Y having different silica-to-alumina ratios.

The synthesis gel of the methods of synthesis as described above can have a ratio of $SDA_2O/SiO_2$ of less than about 1.5.

The synthesis gel can have one or more, two or more, three or more, four or more, five or more, or all six of the following molar compositional ratios:
- $SiO_2/Al_2O_3$ of about 10 to about 80;
- $Na_2O/Al_2O_3$ of about 0 to about 2;
- $M_{AE}O/Al_2O_3$ of about 0.3 to about 1.5 ($M_{AE}$ can be Ca, Sr, or Ba);
- $SDA_2O/Al_2O_3$ of about 0.7 to about 20;
- $H_2O/Al_2O_3$ of about 300 to about 3000; and
- $OH^-/SiO_2$ of about 0.25 to about 0.5.

The synthesis gel preferably can have one or more, two or more, three or more, four or more, five or more, or all six of the following molar compositional ratios:
- $SiO_2/Al_2O_3$ of about 20 to about 80;
- $Na_2O/Al_2O_3$ of about 0 to about 2;
- $M_{AE}O/Al_2O_3$ of about 0.5 to about 1.5 ($M_{AE}$ can be Ca, Sr, or Ba);
- $SDA_2O/Al_2O_3$ of about 1 to about 6;
- $H_2O/Al_2O_3$ of about 600 to about 3000; and/or
- $OH^-/SiO_2$ of about 0.25 to about 0.5.

When the aluminosilicate zeolite is CHA, the synthesis gel preferably has one or more, two or more, three or more, four or more, five or more, or all six of the following molar compositional ratios:
- $SiO_2/Al_2O_3$ of about 20 to about 80;
- $Na_2O/Al_2O_3$ of about 0 to about 2;
- $M_{AE}O/Al_2O_3$ of about 0.5 to about 1.5 ($M_{AE}$ can be Ca, Sr, or Ba);
- $SDA_2O/Al_2O_3$ of about 1 to about 6;
- $H_2O/Al_2O_3$ of about 600 to about 3000; and/or
- $OH^-/SiO_2$ of about 0.25 to about 0.5.

When the aluminosilicate zeolite is AEI, the synthesis gel preferably has one or more, two or more, three or more, four or more, five or more, or all six of the following molar compositional ratios:
- $SiO_2/Al_2O_3$ of about 20 to about 60;
- $Na_2O/Al_2O_3$ of about 0 to about 2;
- $M_{AE}O/Al_2O_3$ of about 0.5 to about 1.5 (alkaline earth metal ($M_{AE}$) can be Ca, Sr, or Ba);
- $SDA_2O/Al_2O_3$ of about 1 to about 6;
- $H_2O/Al_2O_3$ of about 600 to about 3000; and/or
- $OH^-/SiO_2$ of about 0.25 to about 0.5.

When the aluminosilicate zeolite is AFX, the synthesis gel preferably has one or more, two or more, three or more, four or more, five or more, or all six of the following molar compositional ratios:
- $SiO_2/Al_2O_3$ of about 20 to about 60;
- $Na_2O/Al_2O_3$ of about 0 to about 2;
- $M_{AE}O/Al_2O_3$ of about 0.5 to about 1.5 ($M_{AE}$ can be Ca, Sr, or Ba);
- $SDA_2O/Al_2O_3$ of about 1 to about 6;
- $H_2O/Al_2O_3$ of about 600 to about 3000; and/or
- $OH^-/SiO_2$ of about 0.25 to about 0.5.

The synthesis gel can also have one or more of the following molar ratios: $SiO_2/Al_2O_3$ of about 22 to about 80; $SDA_2O/Al_2O_3$ of about 1 to about 6; $OH^-/SiO_2$ of about 0.25 to about 0.5.

The above synthesis method can be preferably used for making alkali free AEI, AFX or CHA, preferably sodium free AEI, AFX or CHA, with the use of Ca, Sr or Ba as $M_{AE}$, in place of the alkali metal, preferably in place of sodium.

The synthesis method described above can also be used to form an aluminosilicate zeolite comprising a framework comprising a number of Al pairs that is at least twice the number of aluminum pairs in a reference aluminosilicate zeolite comprising the same framework, where the reference aluminosilicate was synthesized using a reaction media comprising an alkali metal. The number of Al pairs can be determined by $Co^{2+}$ exchange. In this method, there is little or no sodium. This means that the $Na_2O/Al_2O_3$ is low, about 0.

The synthesis gel can be heated to a temperature greater than 100° C., for example about 120 to about 180° C., or about 140 to about 160° C., for a period of time sufficient to form zeolite crystals. The hydrothermal crystallization process is typically conducted under pressure, such as in an autoclave, and is preferably under autogenous pressure. The reaction mixture can be stirred during crystal formation. The reaction time is typically about 2 to about 15 days, for example about 4 to about 8 days.

To improve selectivity for the small pore framework and/or to shorten the crystallization process, the reaction mixture can be seeded with the small pore zeolite crystals. The small pore zeolite crystals can also be allowed to nucleate spontaneously from the reaction mixture.

The synthesis can be conducted in the absence of the seeded small pore zeolite crystals.

Once the small pore zeolite crystals have formed, the solid product can be separated from the mother liquor by standard mechanical separate techniques, such as filtration. The recovered solid product can then be washed and dried. The crystals can be thermally treated to remove the SDA, thus providing the small pore zeolite product. The small pore zeolite crystals can also be calcined.

The small pore (e.g., AEI, CHA, AFX) zeolite can be used as a catalyst for various processes, such as treatment of combustion exhaust gas, hydrocarbon cracking, and conversion of methanol to an olefin (MTO), or conversion of methane to methanol. Treatable exhaust gases include those generated by lean burn combustion, such as exhaust from diesel engines, gas turbines, power plants, lean burn gasoline engines, and engines burning alternative fuels such as methanol, CNG, and the like. Other treatable exhaust gases include those generated by rich burn engines, such as gasoline engines. The small pore zeolites can also be used in other chemical processes such as water treatment and/or purification.

A catalyst for hydrocarbon cracking can comprise a pure phase AFX zeolite, wherein the AFX zeolite has a short hexagonal prism morphology.

A catalyst for MTO (or methane to methanol) conversion can comprise a pure phase AFX zeolite, wherein the AFX zeolite has a short hexagonal prism morphology.

A catalyst for methane to methanol conversion can comprise a pure phase AFX zeolite, wherein the AFX zeolite has a short hexagonal prism morphology.

A catalyst for water treatment and/or purification can comprise a pure phase AFX zeolite, wherein the AFX zeolite has a short hexagonal prism morphology.

The pure phase AFX zeolite in these applications is the same as described above in the first aspect of the present invention and can have the features and any combinations thereof as described above.

For the abovementioned processes, the small pore zeolite is preferably used in heterogeneous catalytic reaction systems (i.e., solid catalyst in contact with a gas reactant). To improve contact surface area, mechanical stability, and/or fluid flow characteristics, the catalysts can be disposed on and/or within a large surface area substrate, such a porous substrate. Typically, a washcoat containing the catalyst is applied to an inert substrate, such as corrugated metal plate, pellets, a flow-through honeycomb cordierite or aluminatitanate (AT) support (brick), or a honeycomb wall-flow filter. Alternatively, the catalyst is kneaded along with other components such as fillers, binders, and reinforcing agents, into an extrudable paste which is then extruded through a die to form a honeycomb brick. A catalyst article can comprise a metal-promoted small pore zeolite catalyst described herein coated on and/or incorporated into a substrate.

Small pore (e.g., AEI, CHA, AFX) zeolites according to the present invention can be used in combination with a promoter metal. Promoter metal should be broadly interpreted and specifically includes copper, nickel, zinc, iron, tungsten, molybdenum, cobalt, titanium, zirconium, manganese, chromium, vanadium, niobium, as well as tin, bismuth, and antimony; platinum group metals, such as ruthenium, rhodium, palladium, indium, platinum, and precious metals such as gold and silver. Preferred transition metals are base metals, and preferred base metals include those selected from the group consisting of chromium, manganese, iron, cobalt, nickel, and copper, and mixtures thereof. Preferably at least one of the promoter metals is copper. Other preferred promoter metals include iron, particularly in combination with copper. Preferred metals for converting hydrocarbons and selective reduction of $NO_x$ in exhaust gas include Cu and Fe. Particularly useful metals for oxidizing CO, hydrocarbons, and/or ammonia are Pt and Pd.

The metal used in combination with the small pore (e.g., AEI, CHA, AFX) zeolite is preferably a promoter metal disposed on and/or within the zeolite material as extra-framework metals. As used herein, an "extra-framework metal" is one that resides within the molecular sieve and/or on at least a portion of the molecular sieve surface, preferably as an ionic species, does not include aluminum, and does not include atoms constituting the framework of the molecular sieve. Preferably, the presence of the promoter metal(s) facilitates the treatment of exhaust gases, such as exhaust gas from a diesel engine, including processes such as $NO_x$ reduction, $NH_3$ oxidation, and $NO_x$ storage.

The aluminosilicate zeolite produced in the synthesis gel reaction generally needs to have metal on the zeolite removed before a promoter metal can be added. Typically the aluminosilicate zeolite produced in the synthesis gel reaction is first converted to an ammonia or hydrogen form of the zeolite and the promoter metal is then exchanged into the zeolite, as described herein.

The promoter metal can be present in the zeolite material at a concentration of about 0.1 to about 10 weight percent (wt %) based on the total weight of the zeolite, for example from about 0.5 wt % to about 5 wt %, from about 0.5 to about 1 wt %, from about 1 to about 5 wt %, about 2.5 wt % to about 3.5 wt %. When the promoter metal is copper, iron, or the combination thereof, the concentration of these transition metals in the zeolite material is preferably about 1 to about 5 weight percent, more preferably about 2.5 to about 3.5 weight percent.

The promoter metal can be present in an amount relative to the amount of aluminum in the zeolite, namely the framework aluminum. As used herein, the promoter metal: aluminum (M:Al) ratio is based on the relative molar amount of promoter metal to molar framework Al in the corresponding zeolite. Typically, the catalyst material has a M:Al ratio of about 0.1 to about 1.0, preferably about 0.2 to about 0.5. An M:Al ratio of about 0.2 to about 0.5 is particularly useful where M is copper, iron or manganese, and more particularly where M is copper, iron, or manganese and the SAR of the zeolite is about 20 to about 25.

Preferably, incorporation of Cu occurs during synthesis or after, for example, by ion exchange or impregnation. In one example, a metal-exchanged zeolite is synthesized within an ionic copper mixture. The metal-exchanged zeolite may then be washed, dried, and calcined.

Generally, ion exchange of the catalytic metal cation into or on the molecular sieve may be carried out at room temperature or at a temperature up to about 80° C. over a period of about 1 to 24 hours at a pH of about 3 to about 7. The resulting catalytic molecular sieve material is preferably dried at about 80 to about 120° C. overnight and calcined at a temperature of at least about 500° C.

The catalyst composition can comprise the combination of at least one promoter metal and at least one alkali or alkaline earth metal, wherein the transition metal(s) and alkali or alkaline earth metal(s) are disposed on or within the zeolite material. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. Alkali metals are preferred. Alternatively, alkaline earth metals are preferred. Preferred alkali or alkaline earth metals include calcium, potassium, and combinations thereof. The catalyst composition can be essentially free of magnesium and/or barium. The catalyst can be essentially free of any alkali or alkaline earth metal except calcium and potassium. The catalyst can be essentially free of any alkali or alkaline earth metal except calcium. The catalyst can be essentially free of any alkali or alkaline earth metal except potassium. As used herein, the term "essentially free" with respect to metal means that the material does not have an appreciable amount of the particular metal. That is, the particular metal is not present in amount that would affect the basic physical and/or chemical properties of the material, particularly with respect to the material's capacity to selectively reduce or store $NO_x$.

The metal promoted zeolite catalyst composition, obtainable or obtained by the synthesis as described in the first two aspects, can further comprise at least one alkali or alkaline earth metal, wherein the alkali or alkaline earth metal(s) are disposed on or within the promoter metal containing zeolite catalyst. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. Typically, alkali metals are preferred. Alternatively, alkaline earth metals are preferred. Preferred alkali or alkaline earth metals include calcium, potassium, and combinations thereof. The catalyst composition can be essentially free of magnesium and/or barium. Alternatively, the catalyst can be essentially free of any alkali or alkaline earth metal except calcium and potassium. The catalyst can be essentially free of any alkali or alkaline earth metal except calcium. The catalyst can be essentially free of any alkali or alkaline earth metal except potassium. As used herein, the term "essentially free" with respect to metal means that the material does not have an appreciable amount of the particular metal. That is, the particular metal is not present in amount that would affect the basic physical and/or chemical properties of the material, particularly with respect to the material's capacity to selectively reduce or store $NO_x$.

The zeolite material can have a post-synthesis alkali/alkali-earth content of less than 3 weight percent, more preferably less than 1 weight percent, and even more preferably less than 0.1 weight percent. Here, post-synthesis alkali content refers to the amount of alkali/alkali-earth metal occurring in the zeolite as a result of synthesis (i.e., alkali/alkali-earth derived from the synthesis starting materials) and does not include alkali/alkali-earth metal added after synthesis. Typically, an alkali/alkali-earth metal can be added after synthesis to work in combination with the promoter metal.

The metal promoted zeolite catalysts of the present invention can also contain a relatively large amount of cerium (Ce). Typically, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. Typically, the cerium concentration in the catalyst material is about 50 to about 550 $g/ft^3$, from about 75 to about 350 $g/ft^3$, from about 100 to about 300 $g/ft^3$, and from about 100 to about 250 $g/ft^3$. Other ranges of Ce include: above 100 $g/ft^3$, above 200 $g/ft^3$, above 300 $g/ft^3$, above 400 $g/ft^3$, and above 500 $g/ft^3$.

Certain aspects of the invention provide a catalytic washcoat. The washcoat comprising the small pore (e.g., AEI, CHA, AFX) zeolite catalyst described herein is preferably a solution, suspension, or slurry. Suitable coatings include surface coatings, coatings that penetrate a portion of the substrate, coatings that permeate the substrate, or some combination thereof.

In general, the production of an extruded solid body containing the metal promoted small pore (e.g., AEI, CHA, AFX) zeolite catalyst involves blending the small pore (e.g., AEI, CHA, AFX) zeolite and the promoter metal (either separately or together as a metal-exchanged zeolite), a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A metal-promoted small pore (e.g., AEI, CHA, AFX) zeolite catalyst may also be washcoated or otherwise applied to the extruded solid body as one or more sub-layers that reside on the surface or penetrate wholly or partly into the extruded solid body. Alternatively, a metal-promoted small pore (e.g., AEI, CHA, AFX) zeolite can be added to the paste prior to extrusion.

Extruded solid bodies containing metal-promoted small pore (e.g., AEI, CHA, AFX) zeolites according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the metal-promoted small pore (e.g., AEI, CHA, AFX) zeolite is dispersed throughout, and preferably evenly throughout, the entire extruded catalyst body.

Where any of the above extruded solid bodies are made into a wall-flow filter, the porosity of the wall-flow filter can be from about 30% to about 80%, such as from 40% to about 70%. Porosity and pore volume and pore radius can be measured e.g. using mercury intrusion porosimetry The metal-promoted small pore (e.g., AEI, CHA, AFX) catalyst described herein can promote the reaction of a reductant, preferably ammonia, with nitrogen oxides to selectively form elemental nitrogen ($N_2$) and water ($H_2O$). The catalyst can be formulated to favor the reduction of nitrogen oxides with a reductant (i.e., an SCR catalyst). Examples of such reductants include hydrocarbons (e.g., $C_3$-$C_6$ hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

An aluminosilicate zeolite comprising a framework comprising a number of Al pairs that greater than the number of aluminum pairs in a reference aluminosilicate zeolite comprising the same framework formed using an alkali metal can also be used in any of the uses described herein. Preferably, the aluminosilicate zeolite comprising the higher number of Al pairs also contains one or more extra-framework metals, as described herein. The use of these zeolites can provide improved $NO_x$ conversion, less $N_2O$ formation, etc. as described herein.

The metal-promoted small pore (e.g., AEI, CHA, AFX) catalyst described herein can also promote the oxidation of ammonia. Typically, the catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). The metal-promoted small pore (e.g., AEI, CHA, AFX) zeolite catalyst can be disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

SCR and AMOX operations can be performed in series, wherein both processes utilize a catalyst comprising the metal-promoted small pore (e.g., AEI, CHA, AFX) zeolite described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. Typically, a catalyst article having an ammonia slip catalyst is disposed downstream of a selective catalytic reduction (SCR) catalyst. The ammonia slip catalyst oxidizes at least a portion of any nitrogenous reductant that is not consumed by the selective catalytic reduction process. Typically, the ammonia slip catalyst is disposed on the outlet side of a wall flow filter and an SCR catalyst is disposed on the upstream side of a filter. Alternatively, the ammonia slip catalyst is disposed on the downstream end of a flow-through substrate and an SCR catalyst is disposed on the upstream end of the flow-through substrate. The ammonia slip catalyst and SCR catalyst can be disposed on separate substrates (bricks) within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

The SCR and/or AMOX process can be performed at a temperature of at least 100° C. The process(es) can occur at a temperature from about 150° C. to about 750° C. Preferably the temperature range is from about 175 to about 550° C. or from about 175 to about 400° C. Alternatively, the temperature range is about 450 to about 900° C., preferably about 500 to about 750° C., about 500 to about 650° C., about 450 to about 550° C., or about 650 to about 850° C. Temperatures greater than about 450° C. are particularly useful for treating exhaust gases from a heavy or light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in an exhaust gas, which comprises contacting the exhaust gas with a catalyst described herein in the presence of a reducing agent for a time sufficient to reduce the level of $NO_x$ compounds in the gas. These methods can further comprise one or more of the following steps: (a) accumulating and/or combusting soot that is in contact with the inlet of a catalytic filter; (b) introducing a nitrogenous reducing agent into the exhaust gas stream prior to contacting the catalyst in an SCR filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, can be used to oxidize particulate matter in particulate filter; and/or reduce the particulate matter (PM) in the exhaust gas; and (e) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., an SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as about 20 to about 60 $g/ft^3$. Alternatively, the precious metal of the catalyst is characterized by the average concentration which can be from about 40 to about 100 $grams/ft^3$.

Under certain conditions, during the periodically rich regeneration events, $NH_3$ can be generated over a $NO_x$ adsorber catalyst. The SCR catalyst downstream of the $NO_x$ adsorber catalyst can improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. Typically, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the metal-promoted small pore (e.g., AEI, CHA, AFX) zeolite described herein and at least one additional component for treating the exhaust gas, wherein the catalytic article and at least one additional component are designed to function as a coherent unit.

The system can comprise a catalytic article comprising a metal-promoted small pore (e.g., AEI, CHA, AFX) zeolite described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$.

The system can comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. The at least one platinum group metal can be platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

The metal-promoted small pore zeolite (e.g., AEI, CHA, AFX) catalyst described herein can also be a passive $NO_x$ absorber (PNA) catalyst (i.e. it has PNA activity). Such a catalyst can be prepared according to the method described in WO 2012/166868 (also published as U.S. 2012308439) (both of which are hereby incorporated by reference), and the promoter metal can comprise a noble metal.

The noble metal is typically selected from the group consisting of palladium (Pd), platinum (Pt), rhodium (Rh), gold (Au), silver (Ag), iridium (Ir), ruthenium (Ru) and mixtures of two or more thereof. Preferably, the noble metal is selected from the group consisting of palladium (Pd), platinum (Pt) and rhodium (Rh). More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, or consists of, palladium (Pd) and optionally a second metal selected from the group consisting of platinum (Pt) and rhodium (Rh). More preferably, the noble metal comprises, or consists of, palladium (Pd) and optionally platinum (Pt). Even more preferably, the catalyst comprises palladium as the only noble metal.

When the noble metal comprises, or consists of, palladium (Pd) and a second metal, then the ratio by mass of palladium (Pd) to the second metal is >1:1. Preferably, the ratio by mass of palladium (Pd) to the second metal is >1:1 and the molar ratio of palladium (Pd) to the second metal is >1:1. The aforementioned ratio of palladium relates to the amount of palladium present as part of the PNA catalyst. It does not include any palladium that may be present on the support material. The PNA catalyst can further comprise a base metal. Thus, the PNA catalyst can comprise, or consist essentially of, a noble metal, a small pore zeolite as described herein and optionally a base metal. The base metal can be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the PNA catalyst can be free or substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof.

In general, it is preferred that the PNA catalyst does not comprise a base metal.

It can be preferable that the PNA catalyst is substantially free of barium (Ba), more preferably the PNA catalyst is substantially free of an alkaline earth metal. Thus, the PNA catalyst may not comprise barium, preferably the PNA catalyst does not comprise an alkaline earth metal.

Although the description above contains many specifics, these are merely provided to illustrate the invention and should not be constructed as limitations of the invention's scope. It should be also noted that many specifics could be combined in various ways in a single or multiple embodiments. Thus it will be apparent to those skilled in the art that various modifications and variations can be made in the compositions, processes, catalysts, and methods of the present invention without departing from the spirit or scope of the invention.

EXAMPLES

Materials produced in the examples described below were characterized by one or more of the following analytic methods. Powder X-ray diffraction (PXRD) patterns were collected on a X'pert (Philips) or Bruker D8 powder diffractometer using a CuKα radiation (40-45 kV, 40 mA) at a step size of 0.04° and a 1 s per step between 5° and 40° (2θ). Scanning electron microscopy (SEM) images and chemical compositions by energy-dispersive X-ray spectroscopy (EDX) were obtained on a JEOL JSM7400F and Auriga 60 CrossBeam (FIB/FE-SEM) microscopes, operating at an acceleration voltage of 1.5-3 keV, and a current of 10 μA. The micropore volume and surface area were measured using $N_2$ at 77 K on a 3Flex surface characterization analyzer (Micrometrics).

Reagents:

Zeolite Y (CBV720 (SAR-30-32) from Zeolyst), DI water, 1,3-bis(1-adamantyl) imidazolium hydroxide (BAI-OH, 18% wt), $Sr(OH)_2$ (94%, Sigma), NaOH 1N (diluted from NaOH 99%, Fisher Scientific), 2,6-N,N-diethyl-cis 2,6-dimethylpiperidinium hydroxide (2,6-DMP-OH, 22% wt)

Example 1: Synthesis of JMZ-7

6.1 g of BAI-OH, 18 wt % was mixed with 0.07 g of $Sr(OH)_2$ and 1.91 g of water. Next, 1.04 g of zeolite Y (CBV 720, Zeolyst) having an SAR of ~30-32 was added to the mixture under stirring for 5 minutes. The mixture was then heated at 155° C. under rotation (45 rpm) for 6 days.

To obtain the AFX powder product, the autoclaves were cooled to room temperature in air and the crystalline product was recovered by filtration, washed several times with deionized water and dried at 80° C. overnight in a drying oven. The as-made product (JMZ-7) was calcined at 580° C./8 hours in air with ramping rate of 3° C./min.

Figure 2A:
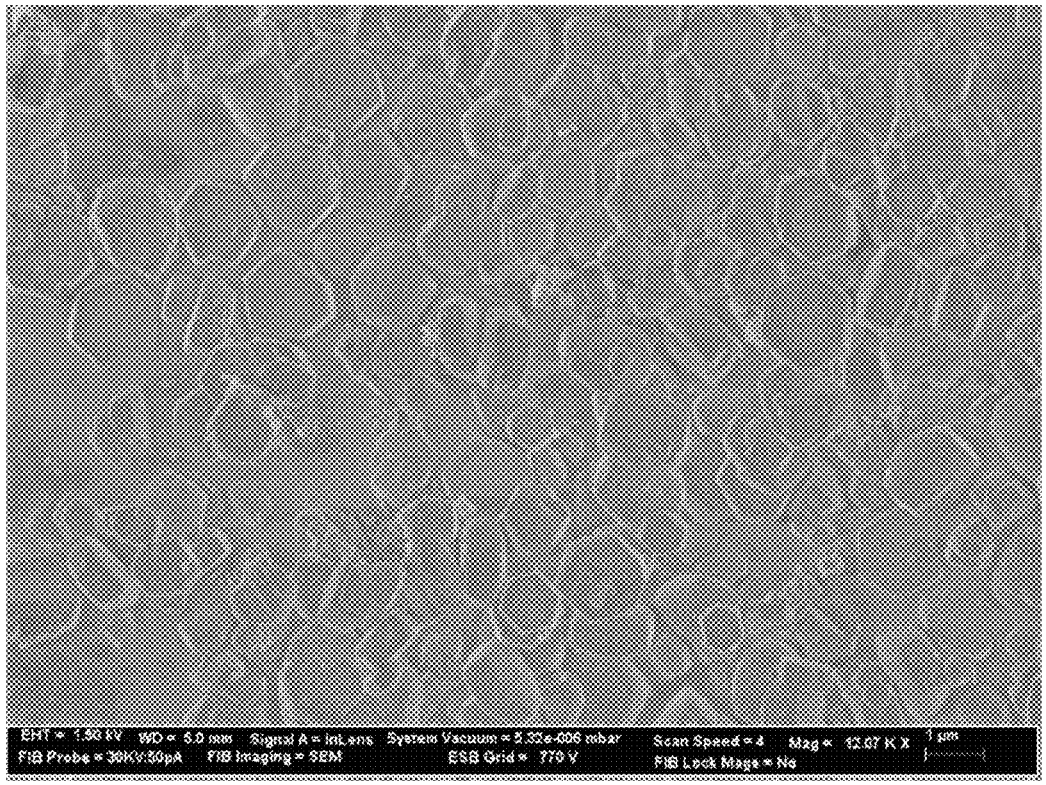
FIGS. 2a and 2b are SEM images of a pure phase AFX zeolite (JMZ-7) according to Example 1.
Figure 2B:

Samples of the dried product were analysed by XRD, SEM, EDX, and $N_2$ adsorption as described above. Analysis of the as-made product by powder XRD (FIG. 1) indicated that the product had an AFX structure. SEM images of the as-made sample (FIGS. 2a and 2b) showed that it had a short hexagonal prism morphology. An $N_2$ adsorption measurements of the calcined product had a BET surfaces area of ~650 m²/g, a pore volume of ~0.27 cm³/g. The calcined product had an SAR of about 30.

Example 2: Synthesis of Reference AFX

Figure 3:
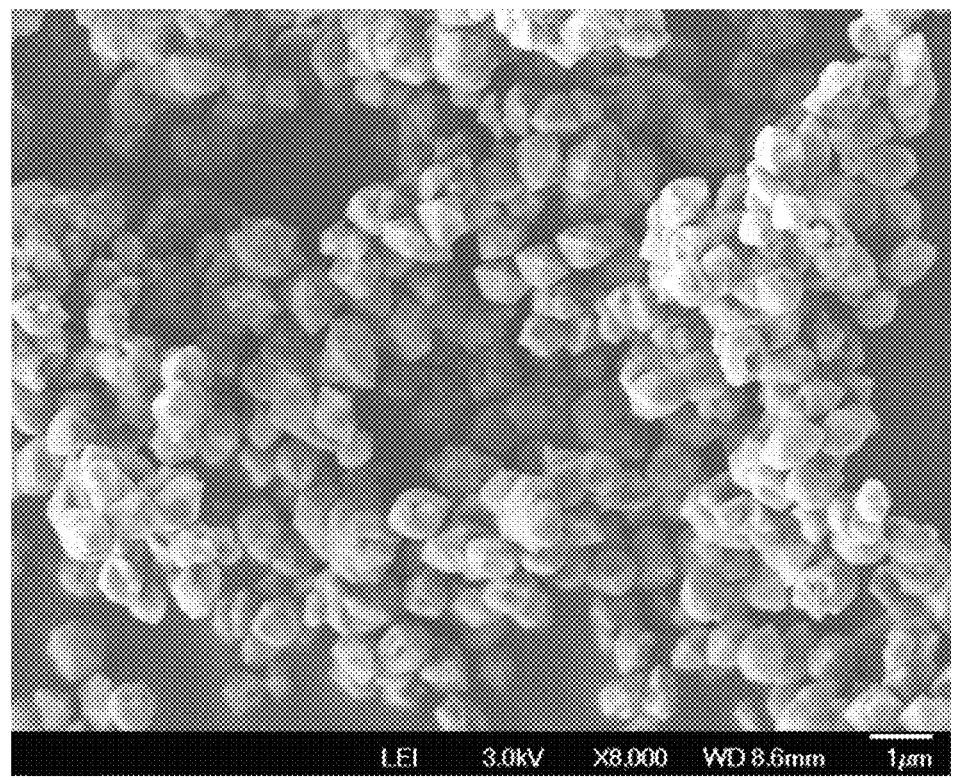
FIG. 3 is an SEM image of the reference AFX zeolite made with Na+ route (Example 2) that shows a truncated hexagonal bipyramid morphology.

A reference AFX zeolite having an SAR ratio of about 22 was synthesized according to Example 1 in US 20160137518 A1 via $Na^+$ route. FIG. 3 is an SEM image of the reference AFX zeolite, which had a truncated hexagonal bipyramid morphology.

Example 3: Synthesis of AEI 10.5 g of the 2,6-DMP-OH (22 wt %) was mixed with 0.22 g of $Sr(OH)_2$ and 5.8 g of water. Then, the mixture was stirred for about 5 minutes. 2.36 g of zeolite Y (CBV 720, Zeolyst) having an SAR of ~30-32 was added to the mixture under stirring for another 5 minutes. The mixture was then heated at 155° C. under rotation (45 rpm) for 5 days.

To obtain the AEI powder product, the autoclaves were cooled to room temperature in air and the crystalline product was recovered by filtration, washed several times with deionized water and dried at 80° C. overnight in a drying oven. The as-made product was calcined at 580° C./8 hours in air with ramping rate of 3° C./min.

Figure 4:
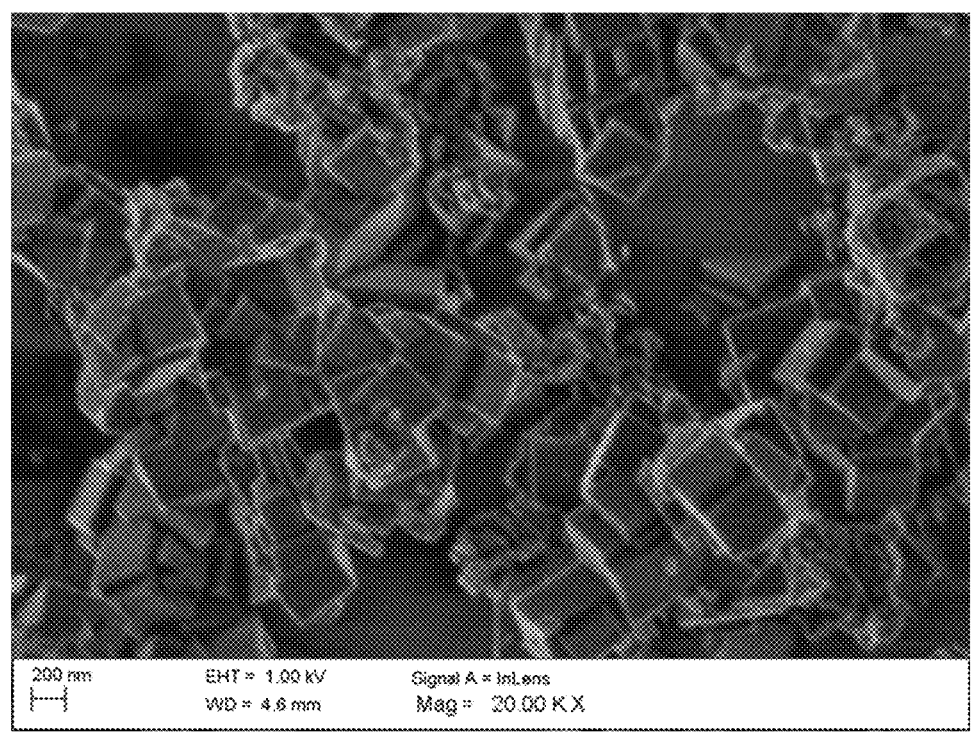
FIG. 4 is an SEM image of a pure phase AEI zeolite prepared in Example 3.

Samples of the dried product were analysed by XRD, $N_2$ adsorption, EDX, and SEM as described above. Analysis of the as-made product by powder XRD indicated that the product had an AEI structure. An $N_2$ adsorption measurements of the calcined product showed that the product had a BET surfaces area of ~670 m²/g, a pore volume of ~0.26 cm³/g. An SEM image of the as-made sample (FIG. 4) showed that it had a cuboid morphology. The calcined product had an SAR of about 30.

TABLE 1

Synthesis Gel Composition of Example 3

| | Recipe | | | | |
|---|---|---|---|---|---|
| | $H_2O$ | $Al_2O_3$ | $SiO_2$ | $Sr(OH)_2$ | 2,6-DMP-OH |
| Mole ratios | 24 | 0.0333 | 1 | 0.05 | 0.35 |

Example 4. Strontium Removal from AFX.Sr by Ammonium-Exchange

The strontium content of AFX synthesized in $Sr^{2+}$ after initial synthesis followed by one and two successive ammonium exchanges is displayed in Figure X. A solution containing 0.42 M $NH_{4+}$ was prepared by dissolving the appropriate amount of ammonium nitrate (Seidler Chemical Company) in de-mineralised water. To this $NH_{4+}$ solution, the $Sr^{2+}$ or $Na^+$ containing AFX.Sr and AFX.Na (both samples have template removed) were added in a ratio of 30 mL of $NH_4$ solution per 1 g of zeolite. The zeolite and $NH_4$ containing solution was heated to ~70° C. with stirring for a few hours. The zeolite was then filtered out of solution and washed with excess de-mineralised water to remove any non-exchanged $NH_4$. This exchange process was repeated multiple times in succession until the $Sr^{2+}$ or $Na^+$ content in the zeolite (as measured by ICP) was removed (typically 1-2 exchanges).

Example 5. Cobalt Exchanges for Al Pair Titration

A solution containing 0.05 M $Co^{2+}$ was prepared by dissolving the appropriate amount of cobalt (II) nitrate hexahydrate (Alfa Aesar) in de-mineralised water. To this $Co^{2+}$ solution, the H-forms of AFX.Sr—H and AFX.Na—H (both samples have template and alkali/alkali earth metal removed) were added in a ratio of 50 mL of $Co^{2+}$ solution per 1 g of zeolite. The zeolite and $Co^{2+}$ containing solution was heated to ~70° C. with stirring for a few hours. The zeolite was then filtered out of solution and washed with excess de-mineralised water to remove any non-exchanged $Co^{2+}$. This exchange process was repeated multiple times in succession until the $Co^{2+}$ content in the zeolite (as measured by ICP) no longer increased (typically 3-5 exchanges).

The quantity of Al pair sites in each of the two materials was determined by the $Co^{2+}$ titration method is displayed in Figure X. $Co^{2+}$ will only exchange at Al pair sites in zeolites as has been rigorously determined by prior literature (Wichterlovi and co-workers, Phys. Chem. Chem. Phys. 2002, 4, 5406-5413. Gounder and co-workers, Chem. Mater. 2016, 28, 2236-2247. Gounder and co-workers, ACS Catal. 2017, 7, 6663-6674.). Al pairs in this instance are defined as two Al sites that are close enough in proximity within the crystalline zeolite framework such that both negative framework charges induced by Al substitution can be balanced by the same $Co^{2+}$ ion. Therefore, $Co^{2+}$ exchange capacity was used to quantify the number of Al pair sites in AFX synthesized in $Sr^{2+}$ compared to AFX synthesized in $Na^+$. The number of Al in pair sites was then normalized on total Al content (determined by XRF) in each material and given as a fraction of the total sites. AFX.Sr—H contained 41% of Al sites as Al pairs whereas AFX.Na—H only contained 6% of Al sites as Al pairs. Normalization was conducted because of a potential difference in the SAR between the two zeolites.

Example 6. Catalyst Testing of Fe-Exchanged AFX for Fast and Standard $NH_3$ SCR Ammonium-exchanged and calcined AFX.Sr—H and AFX.Na—H (both samples have template and alkali removed) were impregnated with iron at a loading of 3.33 wt % using the required amount of ferric nitrate nonahydrate (VWR) dissolved in de-mineralised water. The Fe-impregnated AFX.Sr—H and AFX.Na—H samples (designated AFX.Sr—Fe and AFX.Na—Fe, respectively) were dried overnight at 80° C. and then calcined in air at 550° C. for 4 hours.

Samples of the powdered catalyst were pelletized and then aged in a flow of 10% $H_2O$ in air. The samples were heated at a rate of 10° C./min to 250° C. in air only. The samples were then heated at a rate of 10° C./min in 10% $H_2O$ in air to 550° C. After being held at a temperature of 550° C. for 100 hours, the samples were cooled in the steam/air mixture until then temperature was <250° C. The samples were then cooled from 250° C. to room temperature in an air only flow.

Pelletized samples of the powder catalyst were tested in an apparatus in which a gas comprising 500 ppm $NO_x$ (NO-only or 1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h. The samples were heated from room temperature to 150° C. under the above mentioned gas mixture except for $NH_3$. At 150° C., $NH_3$ was added in to the gas mixture and the samples were held under these conditions for 30 min. The temperature was then increased (ramped) from 150 to 500° C. at 5° C./minute.

Figure 7A:
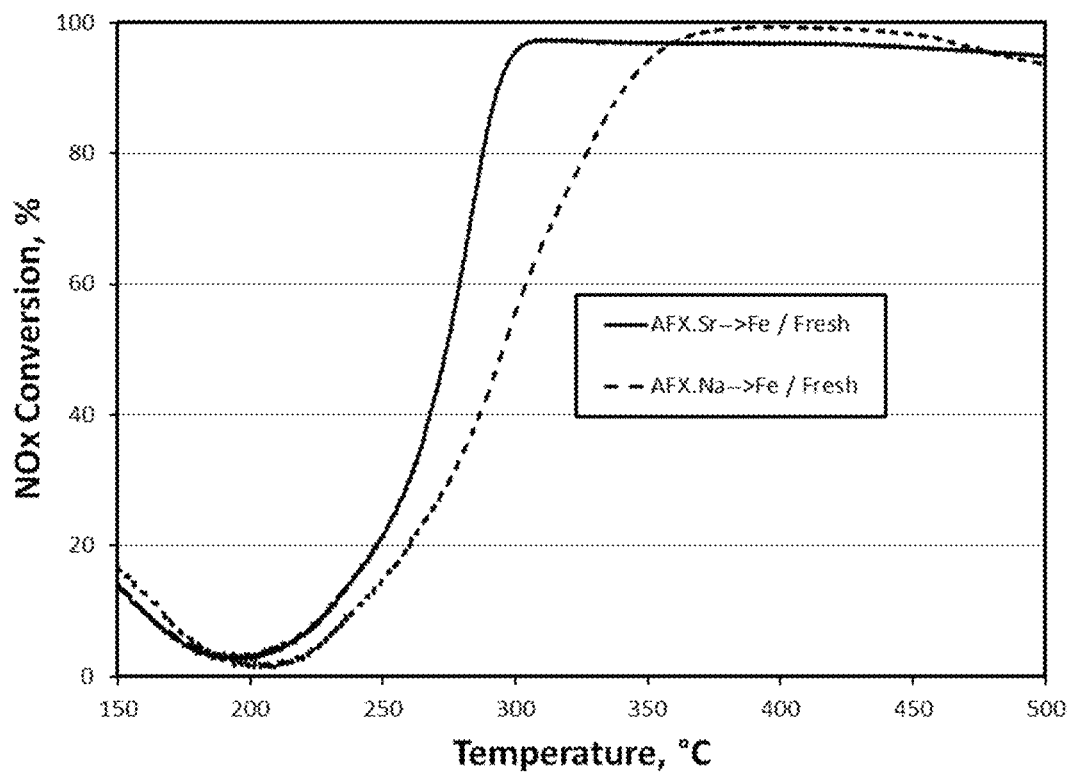
FIG. 7a is $NO_x$ conversion profiles of fresh samples AFX.Sr—Fe and AFX.Na—Fe under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.
Figure 7B:
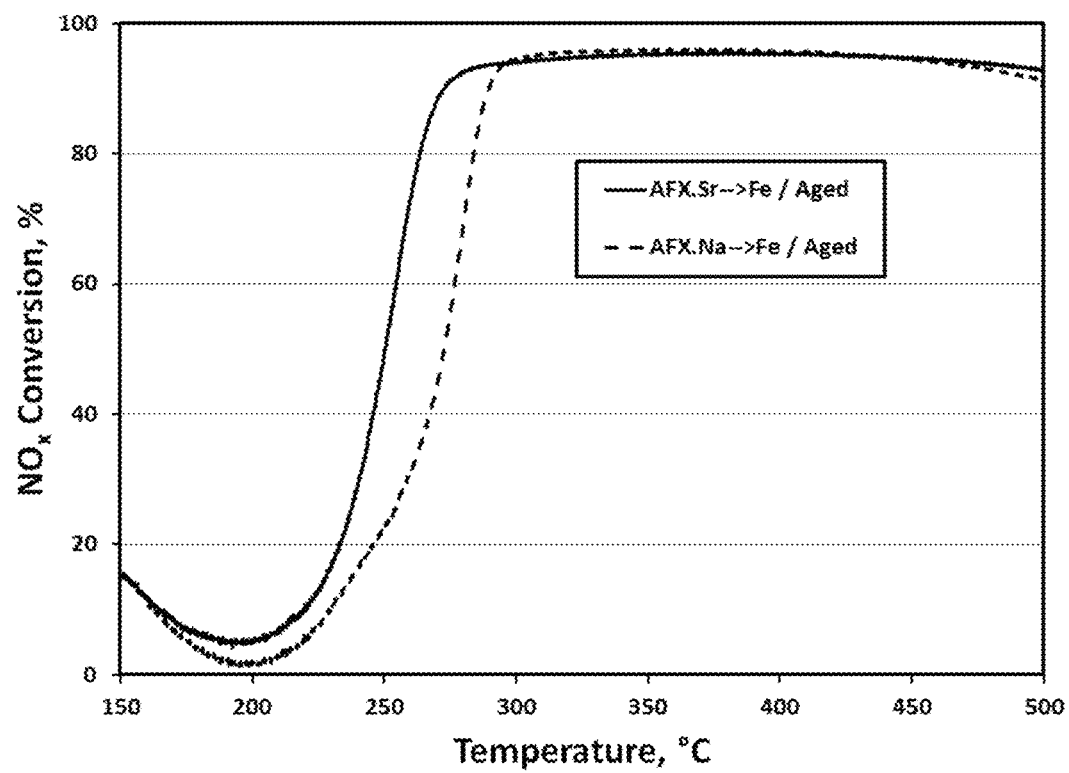
FIG. 7b is $NO_x$ conversion profiles of aged samples AFX.Sr—Fe and AFX.Na—Fe under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.

Fresh and aged $NO_x$ (1:1 $NO:NO_2$) conversion activity profiles over temperatures from 150° C. to 500° C. are given in FIGS. 7A and 7B. The activity of fresh AFX.Sr—Fe exhibited a T50 (the temperature at which 50% conversion of $NO_x$ is achieved) of 273° C. which was 22° C. lower than the T50 of AFX.Na—Fe (295° C.). Furthermore, AFX.Sr—Fe displayed enhanced $NO_x$ conversions up to 35% higher than AFX.Na—Fe at temperatures <360° C. At temperatures >360° C., AFX.Sr—Fe and AFX.Na—Fe achieved similar $NO_x$ conversions (>95%). Both samples exhibited enhanced $NO_x$ conversion after aging, with both samples being affected equally. The aged sample of AFX.Sr—Fe once again demonstrated a lower T50 at 250° C. than AFX.Na—Fe at 273° C. Moreover, AFX.Sr—Fe showed enhanced $NO_x$ conversions up to 35% higher than AFX.Na—Fe at temperatures <295° C. At temperatures >295° C., AFX.Sr—Fe and AFX.Na—Fe achieved similar $NO_x$ conversions (~95%).

Figure 8A:
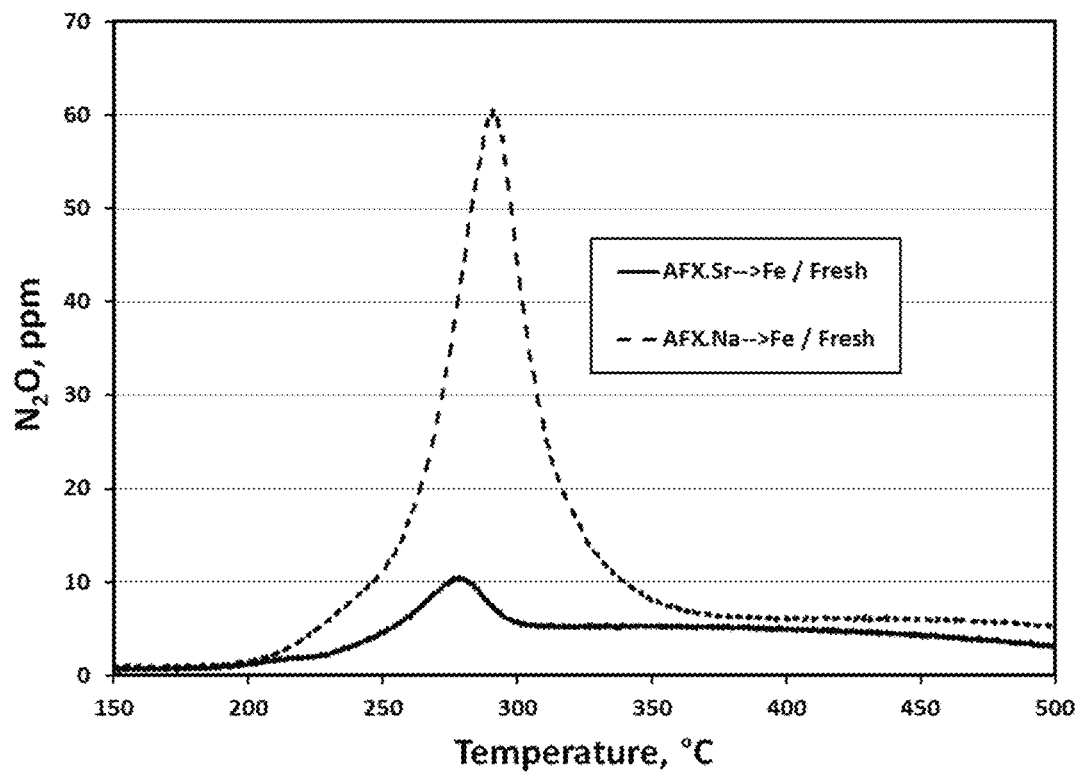
FIG. 8a shows $N_2O$ production profiles from fresh samples of AFX.Sr—Fe and AFX.Na—Fe under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.
Figure 8B:
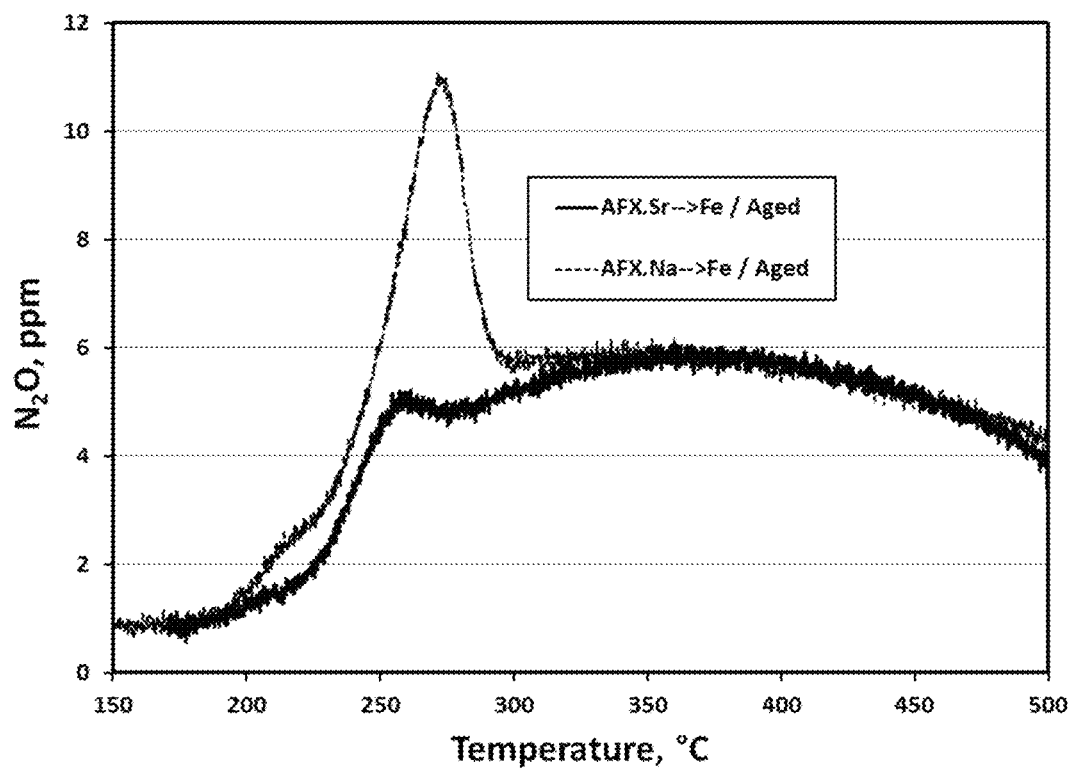
FIG. 8b shows $N_2O$ production profiles of aged samples of AFX.Sr—Fe and AFX.Na—Fe under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.

The concentration of $N_2O$ in gas passing through fresh and aged catalysts over temperatures from 150° C. to 500° C. are given in FIGS. 8A and 8B. Gas flowing into the apparatus contained 500 ppm $NO_x$ as 1:1 $NO:NO_2$. In the fresh samples, AFX.Sr—Fe produced significantly less $N_2O$ (peak value of 10 ppm) than AFX.Na—Fe (peak value of 60 ppm) over the entire temperature range. After aging, the $N_2O$ levels for both AFX.Sr—Fe and AFX.Na—Fe decreased significantly. However, AFX.Sr—Fe still produced a significantly less $N_2O$ (peak value of 5 ppm) than AFX.Na—Fe (peak value of 11 ppm) in the 150° C. to 300° C. temperature regime. Only in the range of 325-500° C. did the AFX.Sr—Fe and AFX.Na—Fe produce similar amounts of $N_2O$ after aging.

Figure 9A:
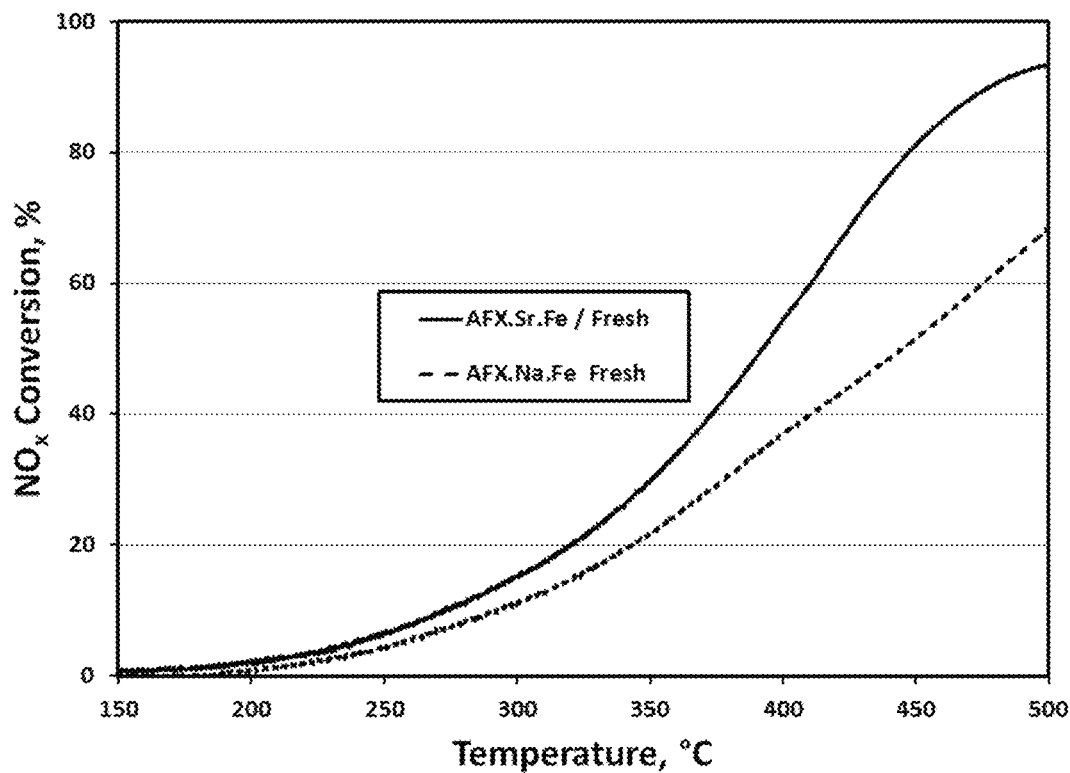
FIG. 9a shows $NO_x$ conversion profiles of fresh samples of AFX.Sr—Fe and AFX.Na—Fe under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.
Figure 9B:
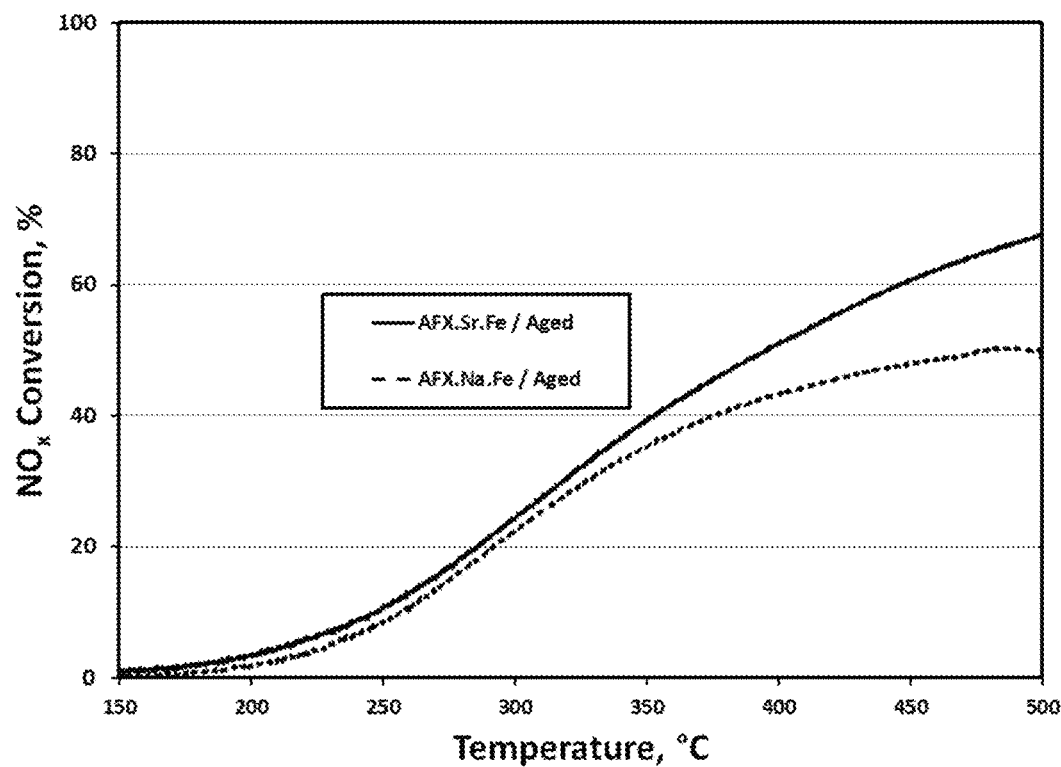
FIG. 9b shows $NO_x$ conversion profiles of aged samples of AFX.Sr—Fe and AFX.Na—Fe under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.

Fresh and aged $NO_x$ (NO-only) conversion activity profiles over temperatures from 150° C. to 500° C. are given in FIGS. 9A and 9B. The activity of fresh AFX.Sr—Fe exhibited a T50 of 390° C. which was 55° C. lower than the T50 of AFX.Na—Fe (445° C.). Furthermore, AFX.Sr—Fe exhibited enhanced $NO_x$ conversion compared to AFX.Na—Fe across the entire temperature range (150-500° C., up to 25% higher $NO_x$ conversion). Both samples exhibited reduced $NO_x$ conversion after aging, however, both samples were not affected equally. The aged sample of AFX.Sr—Fe exhibited a T50 of 395° C. which was only 5° C. higher than the fresh sample. The T50 of the aged AFX.Na—Fe, however, was delayed significantly to 485° C. (40° C. higher than the fresh sample). Additionally, aged AFX.Sr—Fe achieved higher $NO_x$ conversions (up to 17% higher) than AFX.Na—Fe over the entire temperature range.

Figure 10A:
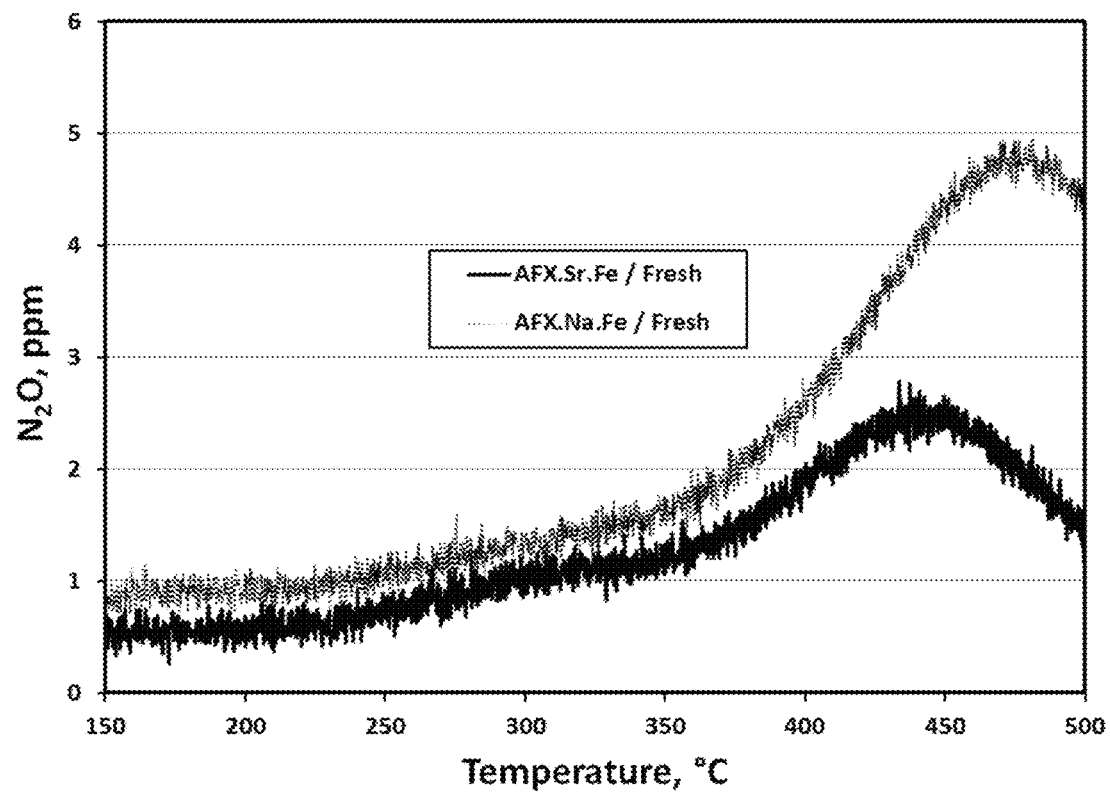
FIG. 10a shows $N_2O$ production profiles of fresh samples of AFX.Sr—Fe and AFX.Na—Fe under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.
Figure 10B:
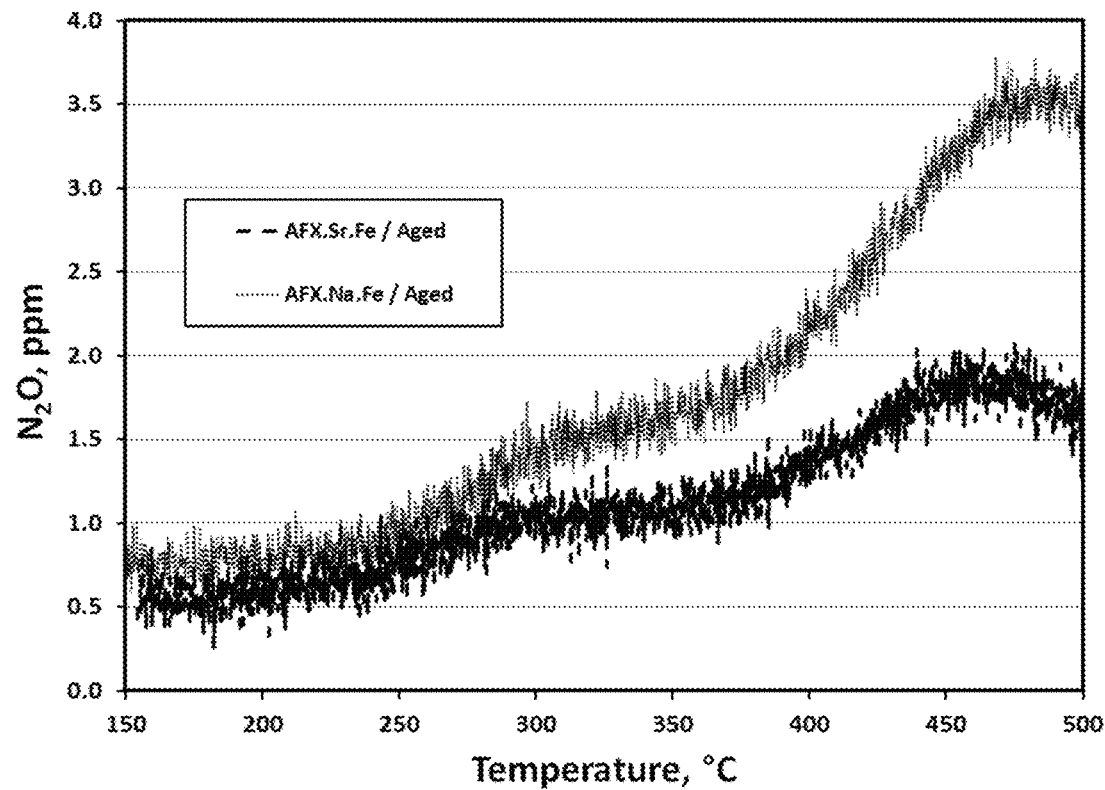
FIG. 10b shows $N_2O$ production profiles of aged samples of AFX.Sr—Fe and AFX.Na—Fe under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.

The concentration of $N_2O$ in gas passing through fresh and aged catalysts over temperatures from 150° C. to 500° C. are given in FIGS. 10A and 10B. Gas flowing into the apparatus contained 500 ppm $NO_x$ as NO only. In the fresh samples, AFX.Sr—Fe produced less $N_2O$ (peak value of 2.5 ppm) than AFX.Na—Fe (peak value of 4.8 ppm) over the entire temperature range. After aging, the $N_2O$ levels for both AFX.Sr—Fe and AFX.Na—Fe decreased slightly. However, AFX.Sr—Fe still produced less $N_2O$ (peak value of 2 ppm) than AFX.Na—Fe (peak value of 3.5 ppm) over the entire temperature range.

Example 7. Catalyst Testing of Mn-Exchanged AFX for Fast and Standard $NH_3$ SCR Ammonium-exchanged and calcined AFX.Sr—H and AFX.Na—H (both samples have template and alkali removed) were impregnated with manganese at a loading of 3.33 wt % using the required amount of manganese (II) acetate (Umicore) dissolved in de-mineralised water. The Mn-impregnated AFX.Sr—H and AFX.Na—H samples (designated AFX.Sr—Mn and AFX.Na—Mn, respectively) were dried overnight at 80° C. and then calcined in air at 550° C. for 4 hours.

Samples of the powdered catalyst were pelletized and then aged in a flow of 10% $H_2O$ in air. The samples were heated at a rate of 10° C./min to 250° C. in air only. The samples were then heated at a rate of 10° C./min in 10% $H_2O$ in air to 550° C. After being held at a temperature of 550° C. for 100 hours, the samples were cooled in the steam/air mixture until then temperature was <250° C. The samples were then cooled from 250° C. to room temperature in an air only flow.

Pelletized samples of the powder catalyst were tested in an apparatus in which a gas comprising 500 ppm $NO_x$ (NO-only or 1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h. The samples were heated from room temperature to 150° C. under the above mentioned gas mixture except for $NH_3$. At 150° C., $NH_3$ was added in to the gas mixture and the samples were held under these conditions for 30 min. The temperature was then increased (ramped) from 150 to 500° C. at 5° C./minute.

Figure 11A:
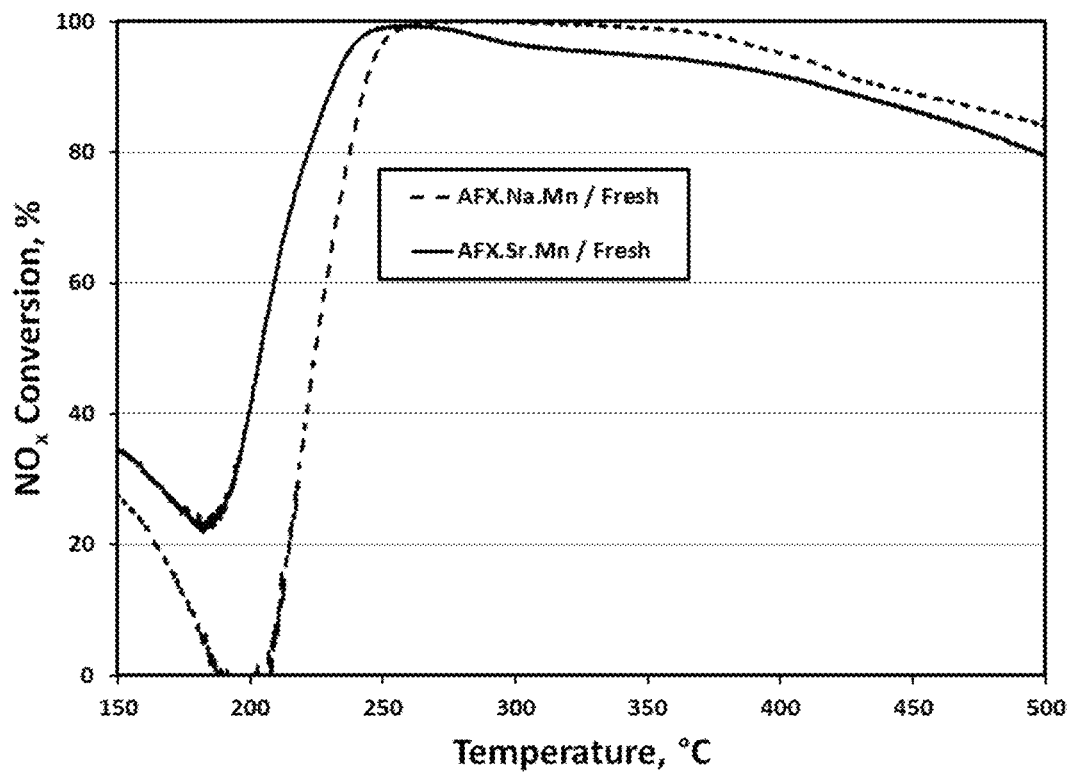
FIG. 11a is $NO_x$ conversion profiles of a) fresh and b) aged samples AFX.Sr—Mn and AFX.Na—Mn under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.
Figure 11B:
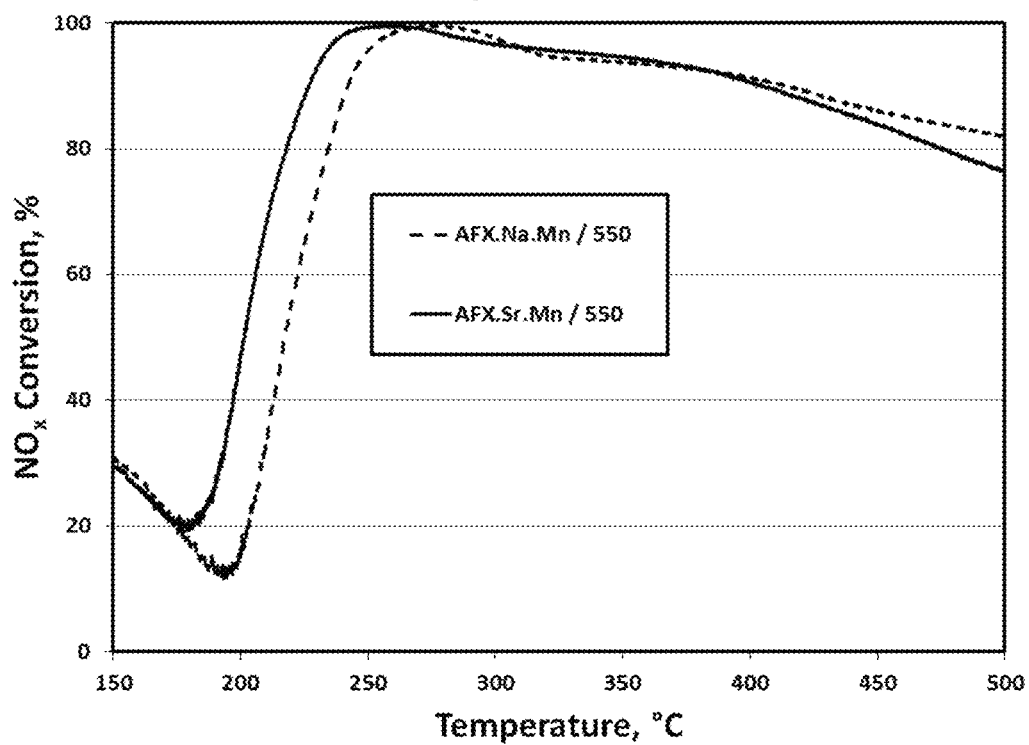
FIG. 11b is $NO_x$ conversion profiles of a) fresh and b) aged samples AFX.Sr—Mn and AFX.Na—Mn under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.

Fresh and aged $NO_x$ (1:1 $NO:NO_2$) conversion activity profiles over temperatures from 150° C. to 500° C. are given in FIG. 11. The activity of fresh AFX.Sr—Mn exhibited a T50 (the temperature at which 50% conversion of $NO_x$ is achieved) of 205° C. which was 20° C. lower than the T50 of AFX.Na—Mn (225° C.). Moreover, AFX.Sr—Mn exhibited significantly enhanced $NO_x$ conversions compared to AFX.Na—Mn at temperatures <260° C. (10-60% higher).

At temperatures >260° C., however, AFX.Na.Mn exhibited a slightly higher (~5%) $NO_x$ conversion than AFX.Sr—Mn. The aged sample of AFX.Sr—Mn once again demonstrated a lower T50 at 200° C. than AFX.Na—Mn at 215° C. Furthermore, at temperatures <265° C., aged AFX.Sr—Mn exhibited equal or higher $NO_x$ conversions (up to 25% higher) than aged AFX.Na—Mn. At temperatures >265° C., however, AFX.Na—Mn exhibited equal or slightly higher $NO_x$ conversions (~5%) compared to AFX.Sr—Mn.

Figure 12A:
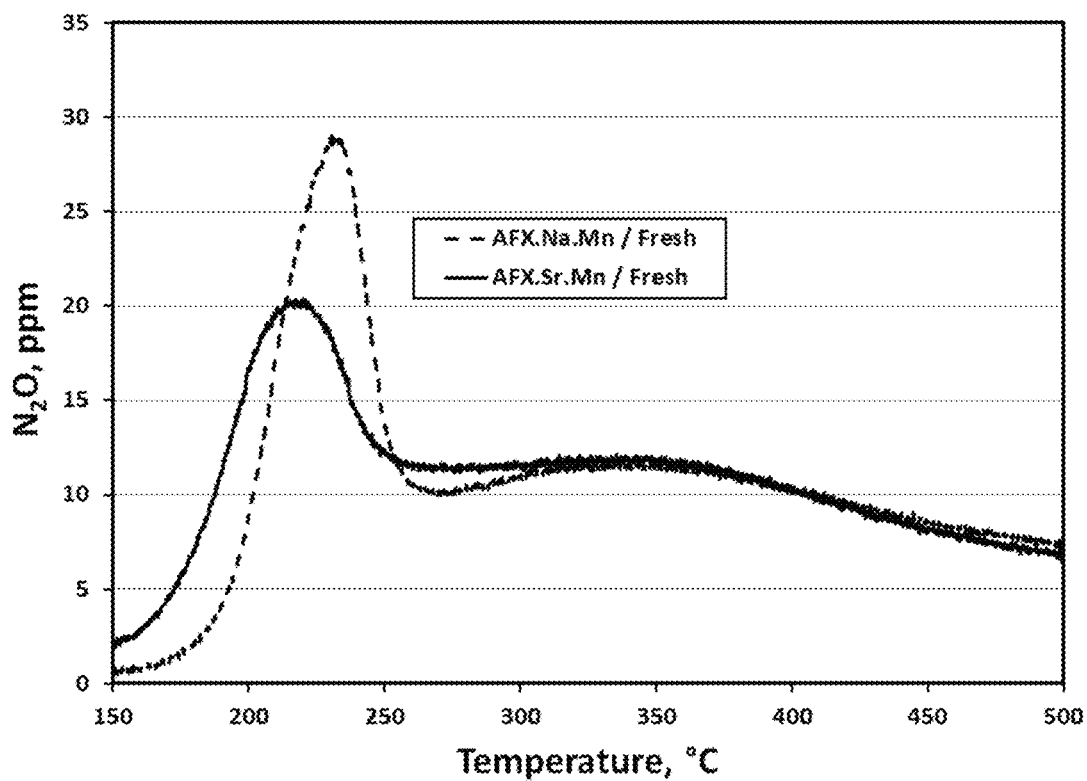
FIG. 12a shows $N_2O$ production profiles of fresh samples AFX.Sr—Mn and AFX.Na—Mn under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.
Figure 12B:
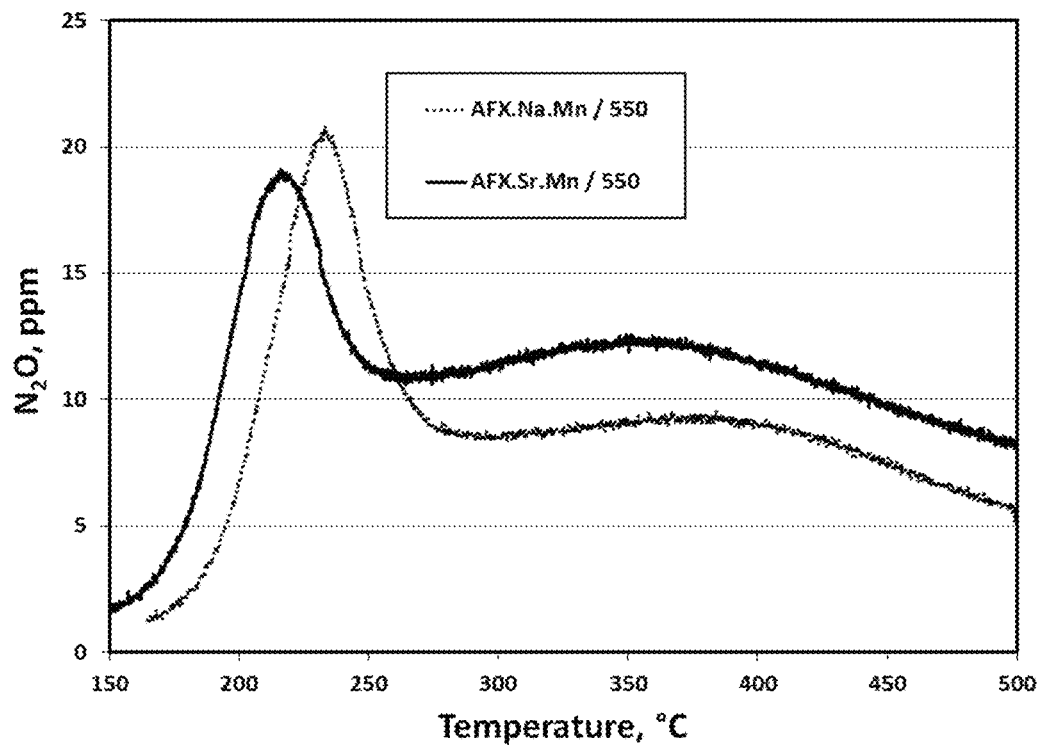
FIG. 12b shows $N_2O$ production profiles of aged samples AFX.Sr—Mn and AFX.Na—Mn under 500 ppm $NO_x$ (1:1 $NO:NO_2$), 500 ppm $NH_3$, 14% $O_2$, 4.6% $H_2O$, 5% $CO_2$, with the remainder being $N_2$ flowed over the catalyst at a space velocity of 90K/h.

The concentration of $N_2O$ in gas passing through fresh and aged catalysts over temperatures from 150° C. to 500° C. are given in FIG. 12. Gas flowing into the apparatus contained 500 ppm $NO_x$ as 1:1 $NO:NO_2$. In the fresh samples, AFX.Sr—Mn produced a lower $N_2O$ spike (peak value of 20 ppm) than AFX.Na—Mn (peak value of 29 ppm). After aging, the peak $N_2O$ levels for both AFX.Sr—Mn and AFX.Na—Mn decreased slightly. However, AFX.Sr—Mn still produced a lower $N_2O$ spike (peak value of 18.5 ppm) than AFX.Na—Mn (peak value of 20.5 ppm) in the 150° C. to 260° C. temperature regime. Only at temperatures >260° C. did the AFX.Sr—Mn produce higher amounts of $N_2O$ than AFX.Na—Mn (~2-3 ppm higher) after aging.

Figure 13A:
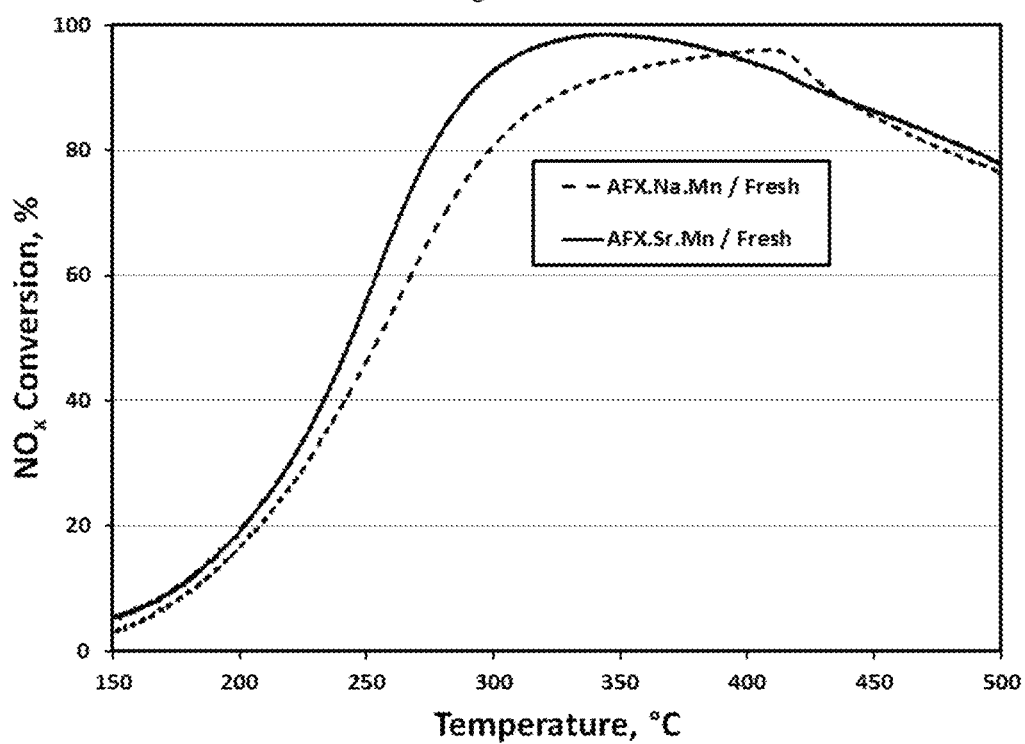
FIG. 13a shows $NO_x$ conversion profiles of fresh samples AFX.Sr—Mn and AFX.Na—Mn under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.
Figure 13B:
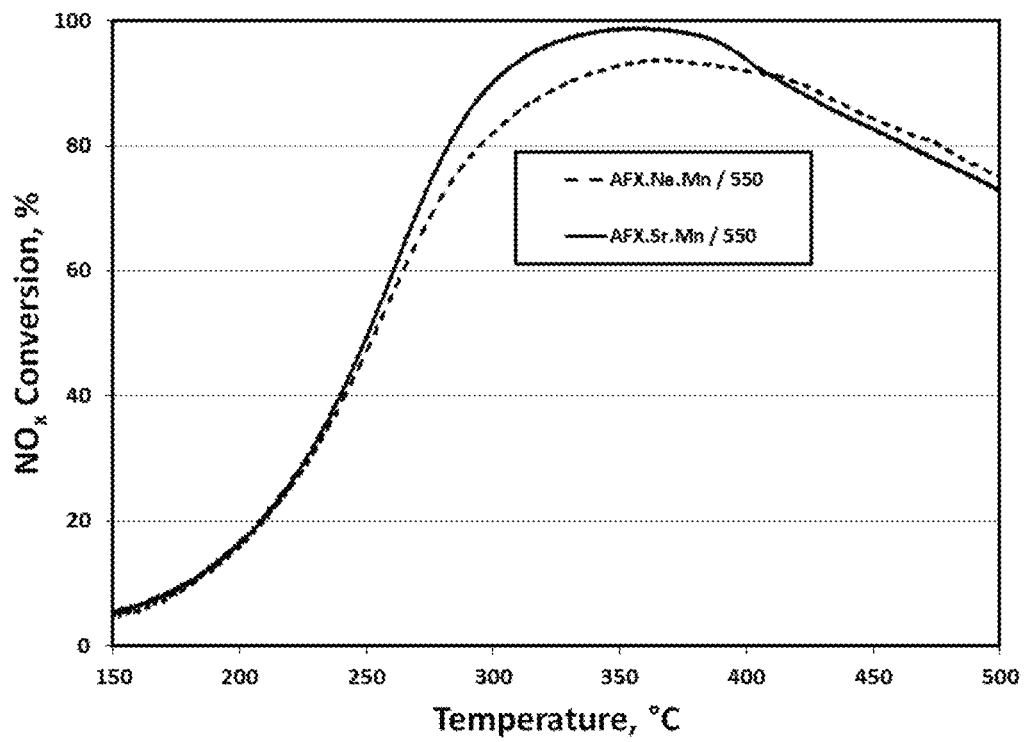
FIG. 13b shows $NO_x$ conversion profiles of aged samples AFX.Sr—Mn and AFX.Na—Mn under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.

Fresh and aged $NO_x$ (NO-only) conversion activity profiles over temperatures from 150° C. to 500° C. are given in FIG. 13. The activity of fresh AFX.Sr—Mn exhibited a T50 of 245° C. which was 10° C. lower than the T50 of AFX.Na—Mn (255° C.). Furthermore, AFX.Sr—Mn exhibited enhanced $NO_x$ conversion compared to AFX.Na—Mn in the temperature range of 150-390° C. (up to 10% higher). At temperatures >390° C., both samples showed similar $NO_x$ conversions. After aging, both AFX.Sr—Mn and AFX.Na—Mn exhibited a T50 of 250° C. which was similar to the fresh performance. AFX.Sr—Mn, however, displayed equal or enhanced $NO_x$ conversions at temperatures <410° C. compared to AFX.Na—Mn (up to 7% higher). At temperatures >410° C., AFX.Na—Mn showed a slightly higher $NO_x$ conversion then AFX.Sr—Mn (~2% higher).

Figure 14A:
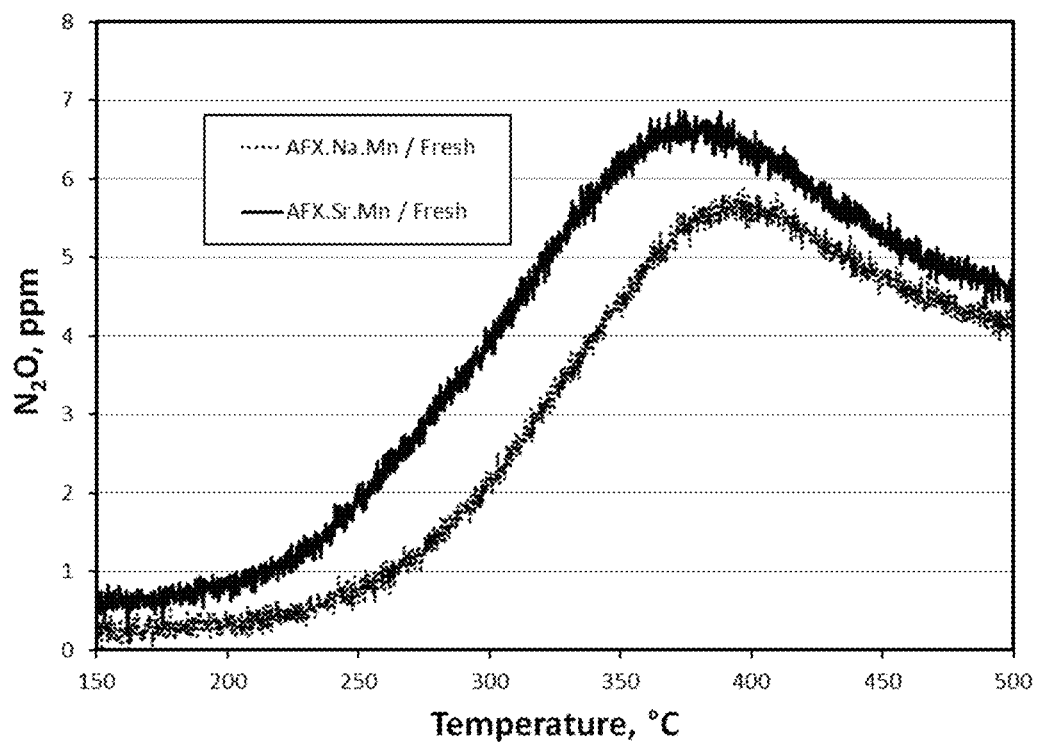
FIG. 14a shows $N_2O$ production profiles of fresh samples of AFX.Sr—Mn and AFX.Na—Mn samples under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.
Figure 14B:
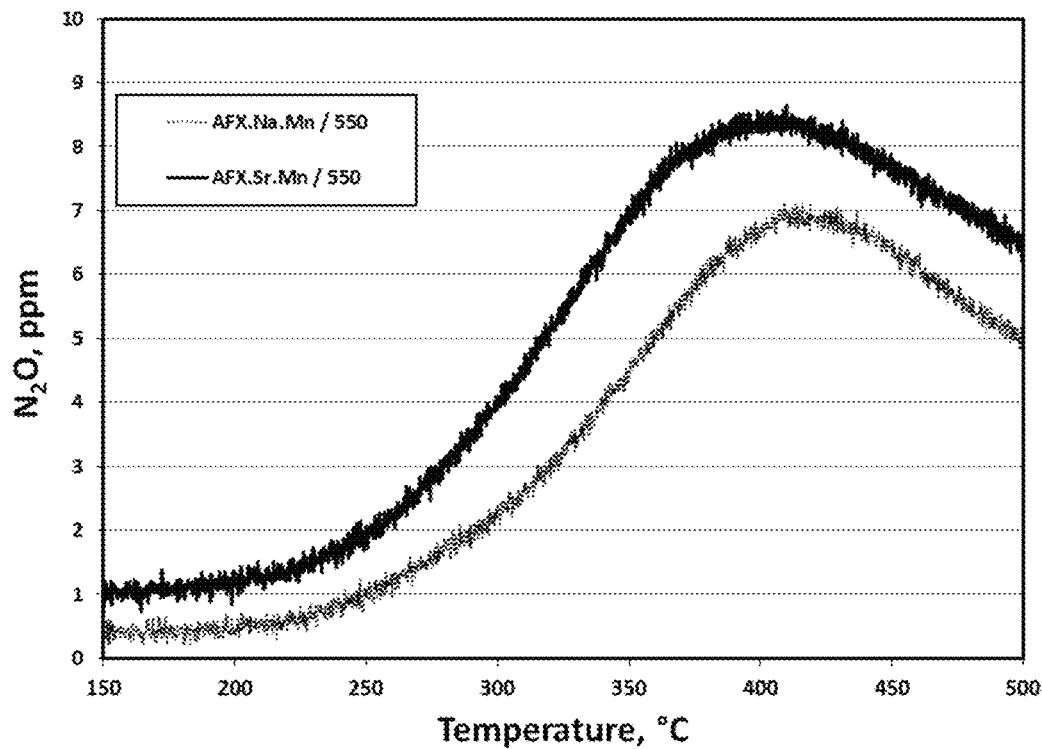
FIG. 14b shows $N_2O$ production profiles of aged samples of AFX.Sr—Mn and AFX.Na—Mn samples under 500 ppm $NO_x$ (NO-only), 500 ppm $NH_3$, 14% $O_2$, 4.6% $H_2O$, 5% $CO_2$, with the remainder being $N_2$ flowed over the catalyst at a space velocity of 90K/h.

The concentration of $N_2O$ in gas passing through fresh and aged catalysts over temperatures from 150° C. to 500° C. are given in FIG. 14. Gas flowing into the apparatus contained 500 ppm $NO_x$ as NO only. In the fresh samples, AFX.Sr—Mn produced more $N_{20}$ (peak value of 6.5 ppm) than AFX.Na—Mn (peak value of 5.5 ppm) over the entire temperature range (about 1 ppm higher at any given temperature). After aging, the $N_2O$ levels for both AFX.Sr—Mn and AFX.Na—Mn increased slightly. However, AFX.Na—Mn still produced less $N_{20}$ (peak value of 7 ppm) than AFX.Sr—Mn (peak value of 8.5 ppm) over the entire temperature range.

The above results indicated that AFX synthesized in the presence of $Sr^{2+}$ rather than $Na^+$ resulted in a material with an altered Al distribution in the form of a higher concentration of Al pairs as exhibited by the Co titration method. Altering this Al distribution facilitated formation of more active and selective catalyst sites during typical Fe or Mn exchange techniques. The resulting AFX.Sr—Fe and AFX.Sr—Mn materials displayed a higher activity and typically higher selectivity for reduction of $NO_x$ to $N_2$ in the presence of $NH_3$ than the analogous materials synthesized in Na (AFX.Na—Fe and AFX.Na—Mn, respectively). This enhancement in activity and selectivity is particularly prominent under equimolar $NO:NO_2$ conditions (so-called fast SCR conditions).

The above examples are set forth to aid in the understanding of the invention, and are not intended and should not be construed to limit in any way the invention set forth in the claims which follow hereafter. Although illustrated and herein described with reference to certain specific embodiments, the present invention is nevertheless not intended to be limited to the details shown, but various modifications may be made therein without departing from the spirit of the invention.

The invention claimed is:

1. An aluminosilicate zeolite comprising at least about 90% phase pure AFX framework, wherein the aluminosilicate zeolite has a short hexagonal prism morphology.

2. The aluminosilicate zeolite of claim 1, wherein the aluminosilicate zeolite is free or substantially free of alkaline metal.

3. A catalyst for treating an exhaust gas comprising a pure phase AFX zeolite that comprises an extra-framework metal selected from V, Cr, Mn, Fe, Co, Ni, Cu, Zn, Mo, Ru, Rh, Pd, Ag, W, Re, Os, Ir, Pt, and Au, wherein the zeolite has a short hexagonal prism morphology.

4. A catalyst article comprising a catalyst according to claim 3 supported on or incorporated into a substrate selected from a wall-flow honeycomb filter and a flow-through honeycomb substrate.

5. A method for storing $NO_x$ comprising contacting an exhaust gas stream containing $NO_x$ with a catalyst of claim 3.

6. A method for selectively reducing $NO_x$ comprising contacting an exhaust gas stream containing NOx with a catalyst of claim 3.

7. A method for oxidizing a component of an exhaust gas comprising contacting an exhaust gas stream containing the component with a catalyst of claim 3, wherein the component is selected from CO, hydrocarbon, and $NH_3$.

8. The aluminosilicate zeolite of claim 3, wherein the aluminosilicate zeolite is free or substantially free of alkaline metal.

* * * * *